United States Patent [19]
Johnston et al.

[11] Patent Number: 5,535,004
[45] Date of Patent: Jul. 9, 1996

[54] DISTANCE MEASURING INTERFEROMETER HAVING SPECIFIC CROSSINGS DETECTION CIRCUIT

[76] Inventors: Gregory E. Johnston, 1528 Monteval Pl., San Jose, Calif. 95120; Robert E. Malm, 16624 Pequeno Pl., Pacific Palisades, Calif. 90272

[21] Appl. No.: 398,494

[22] Filed: Mar. 3, 1995

Related U.S. Application Data

[62] Division of Ser. No. 890,699, May 29, 1992.

[51] Int. Cl.$^6$ .................................................. G01B 9/02
[52] U.S. Cl. .......................................... 356/358; 356/345
[58] Field of Search .................................. 356/358, 363, 356/345, 356, 357

[56] References Cited

U.S. PATENT DOCUMENTS 3,409,375  11/1968  Hubbard ...................................... 356/358
3,572,935  3/1971  Howell et al. ............................ 356/363

*Primary Examiner*—Samuel A. Turner
*Attorney, Agent, or Firm*—Robert E. Malm

[57] ABSTRACT

The distance-measuring apparatus utilizes an interferometric technique to measure the distance to a light-reflecting surface. A laser-generated plane wave is split by a beam splitter into first and second plane waves. The first plane wave is directed to the reflecting surface which reflects it back to the beam splitter. The second plane wave is directed to a reference mirror which reflects it back to the beam splitter where it combines with the reflected first plane wave to form a combination plane wave. The combination plane wave is caused to vary periodically in amplitude by modulating the position of the reference mirror. Changes in the distance to the reflecting surface are obtained by electronically processing the changes in the power of the combination plane wave.

6 Claims, 19 Drawing Sheets

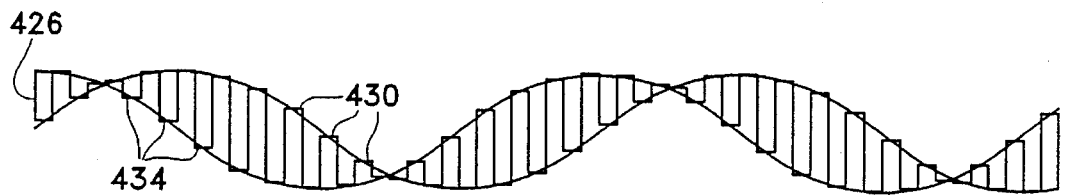
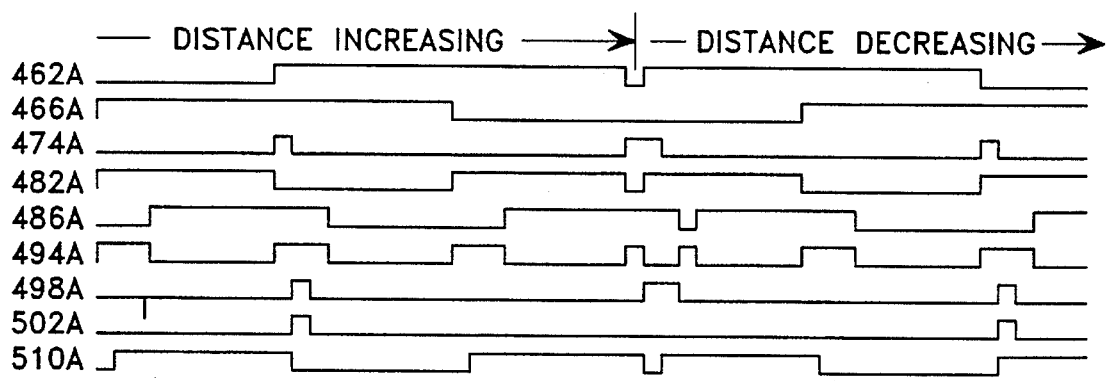
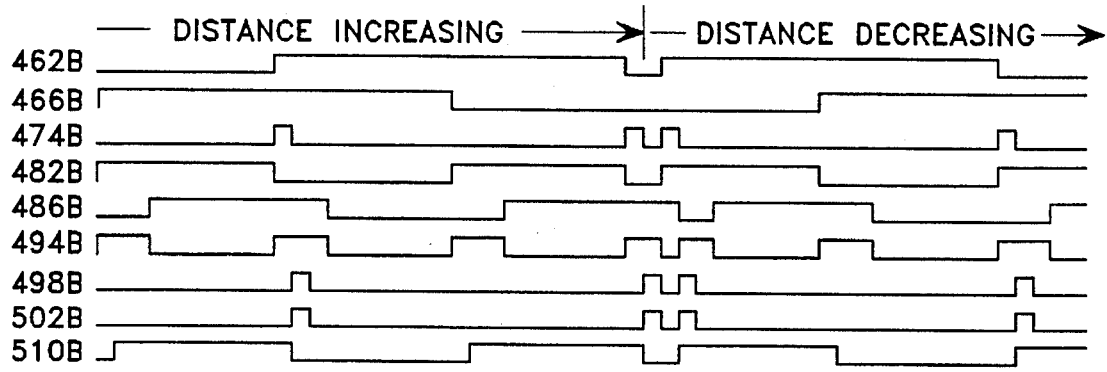
FIG. 9

DISTANCE MEASURING INTERFEROMETER HAVING SPECIFIC CROSSINGS DETECTION CIRCUIT

This application is a division of application Ser. No. 07/890,699, filed May 29, 1992, which is pending.

BACKGROUND OF THE INVENTION

The high-resolution scanning apparatus that constitutes the present invention relates generally to methods and apparatus for converting images recorded on paper and film into digital data so that the images can be conveniently communicated to other locations and processed by digital computers. More specifically, the high-resolution scanning apparatus has to do with mechanisms that systematically scan an image-containing medium thereby enabling electronic circuits to extract the information content of the medium by measuring either the reflectivity or the transmissivity of the medium as a function of the two coordinates that identify points in the plane of the medium.

The development of personal computers with the computational power to process imagery has stimulated a demand on the part of illustrators, photographers, graphic artists, and others whose work is benefited by the computer manipulation of imagery for scanning apparatus that can convert the imagery of photographs and transparencies into digital data that can be handled by computers.

Scanning apparatus consists of a source of light which illuminates the image-containing medium, an optical system that images picture elements ("pixels") of the medium on light detectors, and a transport mechanism which moves the light source, the optical system and the light detectors along a predetermined path thereby obtaining measures of reflectivity or transmissivity of the medium throughout the area of the medium.

A performance parameter of considerable interest is the scanner resolution—how far apart must the pixels be for the scanner to measure the light emanating from a particular pixel. The fundamental limitation of resolution in present-day scanners is the precision of the transport mechanism. Typically, the transport mechanism in today's scanners consists of a screw- or belt-driven carriage moving along a guide rail. The driving means is quite often a stepping motor. The position of the carriage along the rail is obtained by counting the number of steps by the stepping motor.

The precision with which the position of a platform can be established in transport mechanisms of this type is limited by frictional effects, temperature effects, the difficulties of manufacturing ultra-precise parts, and material properties. These limitations appear to limit the resolution of scanners that utilize this type of transport mechanism to something like 2000 dpi (dots per inch).

Thus, while the realizable resolution of photographic materials can be 10,000 dpi or more, the resolution of the great majority of scanners presently on the market is less than 2000 dpi. The efficiency and economy of computer processing of imagery is thereby not available to those who wish to retain the high resolution of their photographs and transparencies during processing.

For example, there exists a large volume of data that has been archived on film and requires computer processing for publishing, electronic access and research. Much of this historical film has been reduced up to 52 times and to properly recover this information in a digital format, the scanner must have a resolution of at least 10,000 dpi.

The demonstrated usefulness of computer processing of imagery, the availability of high-resolution of photographic materials, and the growing population of graphic artists who wish to optimally meld the photographic and electronic technologies together for their benefit and the benefit of their clients has created a need for reasonably-priced scanning apparatus with resolutions of 10,000 dpi or more.

BRIEF SUMMARY OF INVENTION

The high-resolution scanning apparatus utilizes conventional transport mechanisms in combination with a precision interferometric distance-measuring apparatus to achieve extremely-precise measurements of pixel locations thereby permitting scanning resolutions exceeding 10,000 dpi to be achieved.

The high-resolution scanning apparatus is comprised of the conventional elements of a scanner together with one or more precision interferometric distance-measuring devices for the purpose of establishing the precise location of the pixel being measured. With this approach the mechanical limitations of the transport mechanisms that cause the optical system to scan the image-containing medium do not limit the resolution achievable with the scanning apparatus.

The present invention also envisions a mechanism for tilting the optical system relative to the transport mechanism on which it is mounted with the tilting mechanism servo-mechanically controlled by the distance-measuring devices. This approach permits the optical system to be moved to the approximate location of the pixels to be measured and then pointed in the direction required for measuring the light emanating from a particular pixel or group of pixels. The tilting mechanism represents a "fine" adjustment superimposed on the "coarse" adjustment provided by the conventional transport mechanisms. Since the tilting of the optical system can be limited to very small angles, the tilting can be accomplished rapidly and precisely.

The invention may utilize a plurality of light detectors which simultaneously measure the light emanating from an equal number of pixels, the pixels being imaged on the light detectors on a one-to-one basis. The invention has the capability of measuring the location of some arbitrarily-selected pixel—the "reference" pixel—and determining the locations of all other pixels based on the reference pixel measurement.

The illuminating source of light must be above and the optical system below the medium when the medium is a transparency. The invention provides for the closely-synchronized movement of two platforms along parallel tracks, one carrying the light source on the track above the medium and the other carrying the optical system on the track below the medium.

It is intended that the present invention be capable of scanning image-containing media that are in color. This task can be accomplished in the present invention with a color-corrected diffraction-limited lens. A less-expensive approach, and therefore a more desirable one, is to use a non-color-corrected, diffraction-limited lens and either illuminate the medium sequentially with narrowband light sources of different colors or illuminate with white light and filter the light into narrow color bands at the detectors, particular detectors being dedicated to each of the color bands. Given a fixed object distance, the image distance of a non-color-corrected lens varies with wavelength. By placing the groups of detectors at the image distance corresponding to the light color to which they respond, performance equivalent to that provided by a color-corrected lens can be obtained.

The invention also provides a means for compensating for variations in the object distance introduced by imperfections in the transport mechanisms. The light detectors are mounted on a platform that can be moved either nearer to or farther from the lens in accordance with changes in the object distance as measured by a precision interferometric distance-measuring device.

One of the objects of the invention is to provide a means for scanning high-resolution photographic media and converting the imagery into a form suitable for processing by a computer without sacrifice of resolution. A second object is to provide the high-resolution scanning capability without requiring exceedingly-precise and costly transport mechanisms. A third object is to provide the capability of scanning color media with high resolution without the necessity of using a color-corrected lens.

BRIEF DESCRIPTION OF DRAWINGS

FIG. 9 shows the waveforms that illustrate the operation of the z-interferometer processor.

DESCRIPTION OF THE PREFERRED EMBODIMENT

Figure 1:
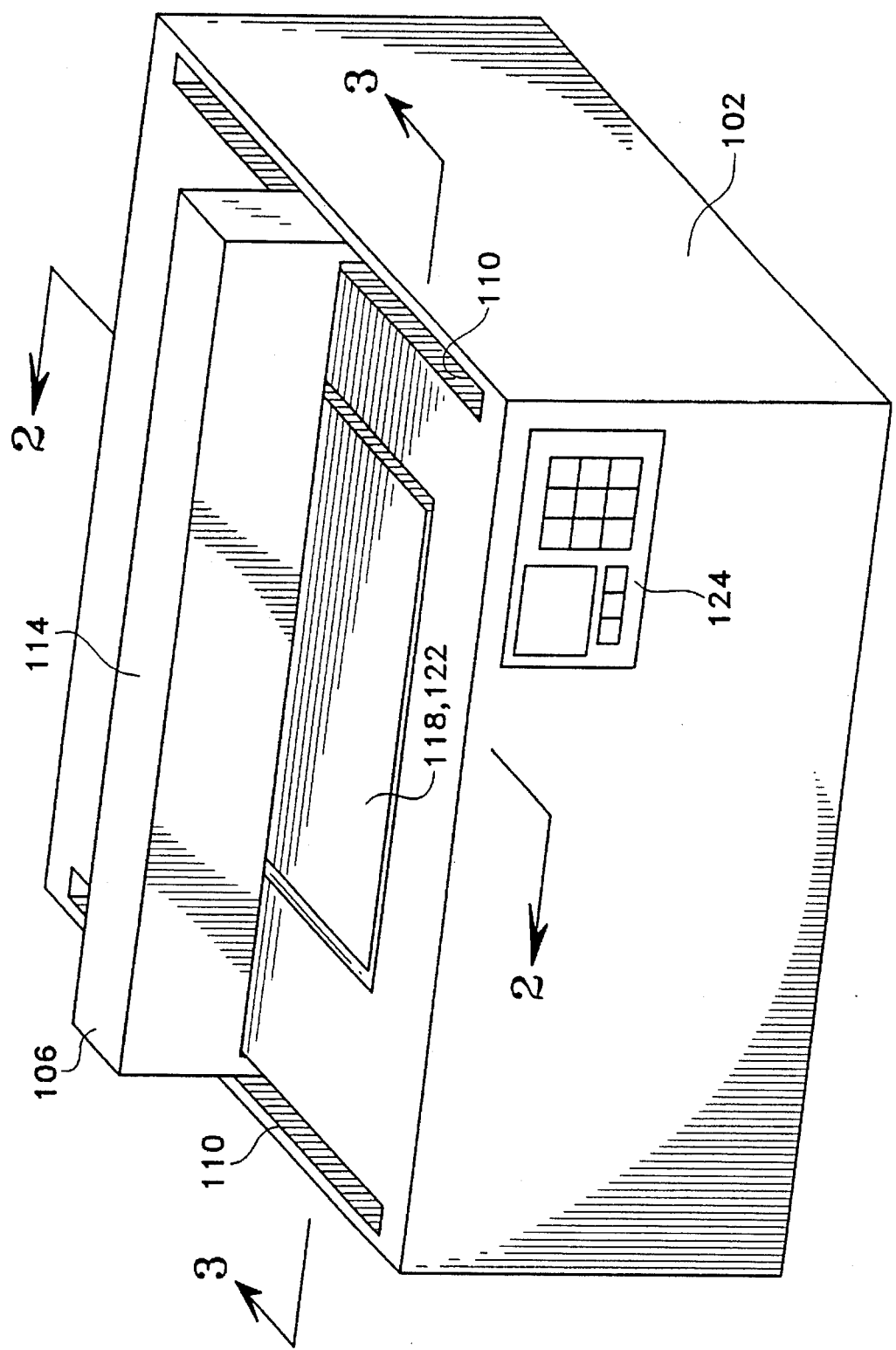
FIG. 1 is an oblique projection of the high-resolution scanning apparatus.

An overall view of the preferred embodiment of the high-resolution scanning apparatus is shown in FIG. 1. The mechanical, electrical, and electronic portions of the apparatus are contained within the enclosure 102 except for a portion of the scanning mechanism 106 that extends through the slots 110 in the top surface of the enclosure and is concealed by the support frame cover 114. The media support assembly 118, 122 in the top surface of the enclosure 102 consists of the glass pressure panel 118 on top of the glass media support panel 122. The pressure panel can be raised to permit image-containing media to be sandwiched between the two panels during the scanning process. During the scanning process, the slots 110 permit the portion of the scanning mechanism concealed beneath the support frame cover 114 to move lengthwise and access all portions of the image-containing media. The control panel 124 permits a user to exercise control over the operation of the scanning apparatus.

Figure 2:
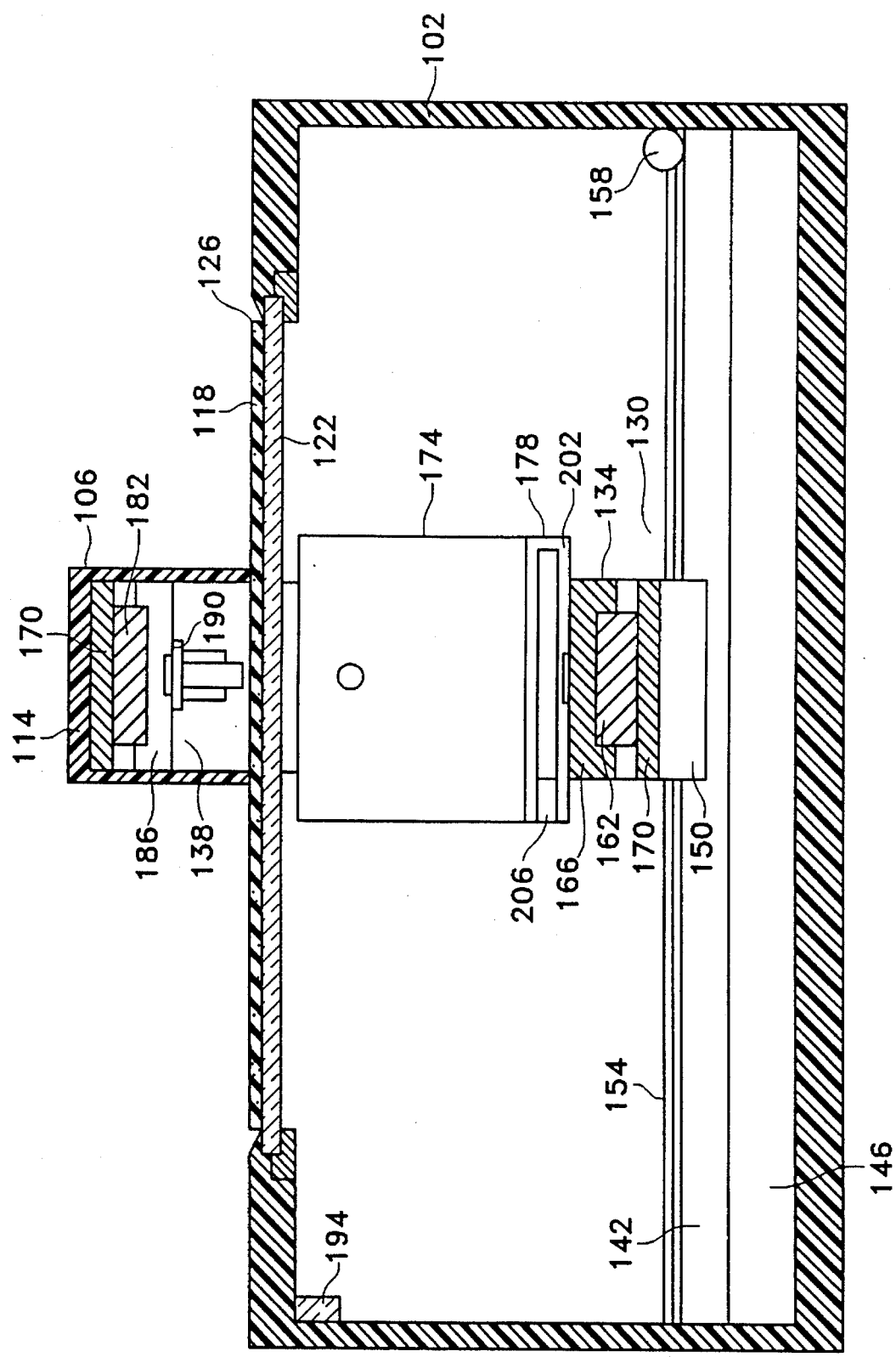
FIG. 2 is a sectional view of the high-resolution scanning apparatus taken upon the plane 2—2 of FIG. 1.
Figure 3:
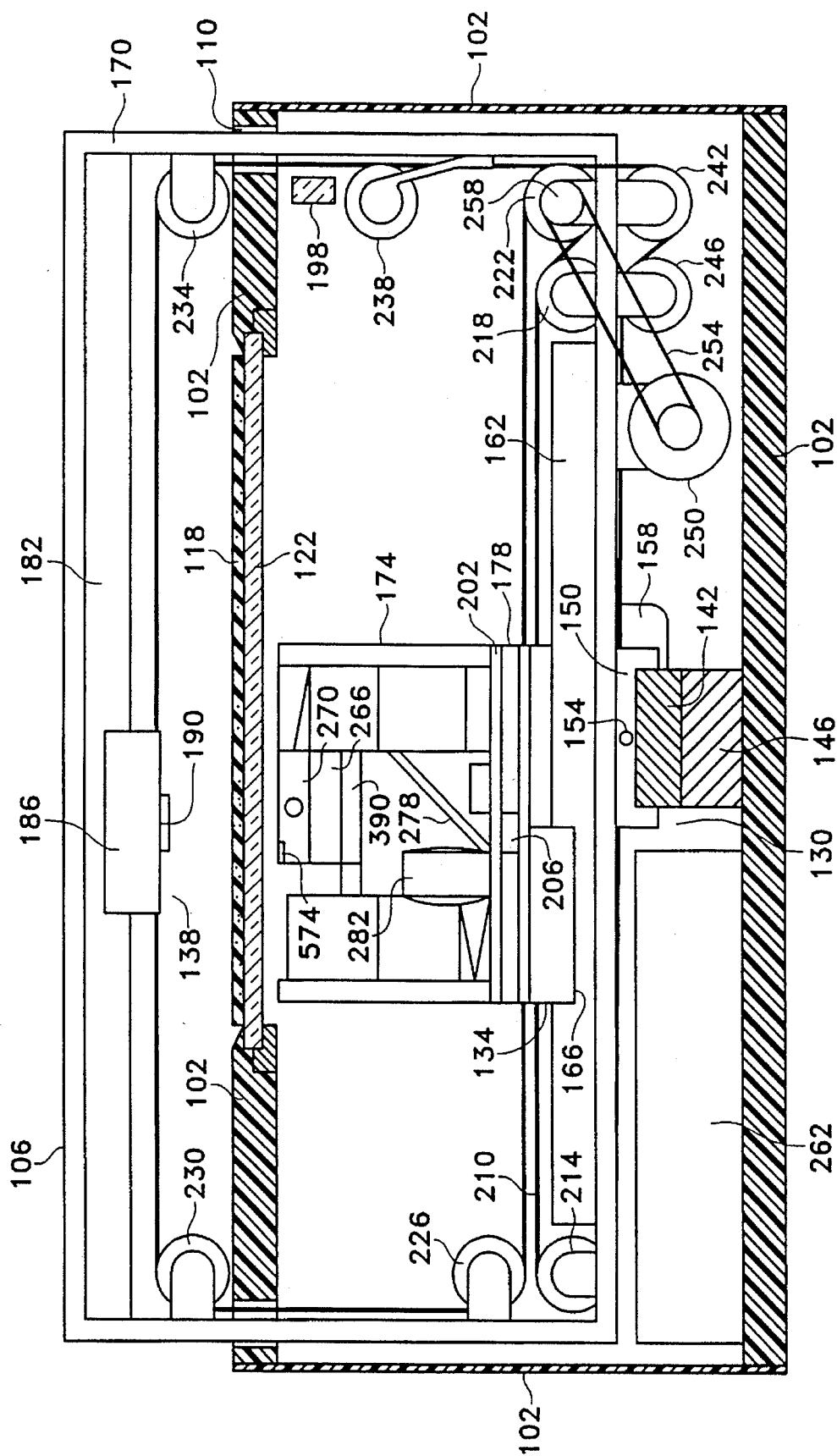
FIG. 3 is a sectional view of the high-resolution scanning apparatus taken upon the plane 3—3 of FIG. 1.

Sectional views of the scanning apparatus taken upon the planes 2—2 and 3—3 are shown in FIGS. 2 and 3 respectively. The media support panel 122 forms part of the top surface of the enclosure 102. The pressure panel 118 is hinged to the top surface of the enclosure 102 at the edge 126 so that it can be raised for the purpose of inserting an image-containing medium between the pressure panel 118 and the support panel 122. The purpose of the pressure panel is to hold the medium in intimate contact with the support panel during the scanning process.

Scanning of the medium in two dimensions is accomplished by the y-axis guide-rail transport mechanism 130, the lower x-axis guide-rail transport mechanism 134, and the upper x-axis guide-rail transport mechanism 138. The y-axis transport mechanism 130 consists of the y-axis double-rail assembly 142 which is mounted on the structural member 146 that is fastened to the enclosure 102 and the y-axis bearing block assembly 150. The y-axis double-rail assembly 142 includes two hardened and ground steel rails which make contact with the y-axis bearing block assembly 150 via steel ball bearings contained in cages within the y-axis bearing block assembly. A guide-rail transport mechanism of sufficient accuracy—less than 10 micrometers per meter of length—is available from Techno, a division of Designatronics, Inc, and described in Techno's Linear Motion Products Catalog (TI-832) (copyright 1989).

The y-axis bearing block assembly 150 is driven along the y-axis double-rail assembly 142 by means of the lead screw 154 having anti-backlash characteristics achieved by utilizing a preloaded nut assembly in the y-axis bearing block assembly 150. The lead screw 154 is driven by the reversible y-axis motor 158.

The lower x-axis transport mechanism 134 consists of the x-axis double-rail assembly 162 and the x-axis bearing block assembly 166. The lower x-axis transport mechanism 134 is mounted within the support frame 170 which in turn is mounted on the y-axis bearing block assembly 150 of the y-axis transport mechanism 130. The optical assembly 174 is mounted on the tilting platform 178 which in turn is mounted on the x-axis bearing block assembly 166 of the lower x-axis transport mechanism 134. The support frame 170 extends through the slots 110 (see FIG. 1) thereby providing a means for supporting portions of the scanning apparatus above the media support assembly 118, 122.

The upper x-axis transport mechanism 138 consists of the x-axis double-rail assembly 182 which is mounted to the support frame 170 and the x-axis bearing block assembly 186. The support frame cover 114 is not shown in FIG. 3. The transmissive media illuminator 190—which does not appear in the view shown in FIG. 2 but does appear in FIG.

3—is mounted on the x-axis bearing block assembly 186 of the upper x-axis transport mechanism 138. The transmissive media illuminator 190 can be either a halogen lamp or three light-emitting diodes having different colors.

The x-axis transport mechanisms 134, 138 are similar to the y-axis transport mechanism 130 but may be of lighter construction since the weight they support are significantly less than the weight supported by the y-axis transport mechanism.

The function of the optical assembly 174 is to image y-axis column segments of picture elements ("pixels") of the illuminated image-carrying medium on linear arrays of light detectors. The x and y coordinates of a "reference" pixel are constantly measured by means of coherent light beams propagated between the optical assembly 174 and light-reflecting structurally-rigid position reference members 194 and 198 that are attached to two adjacent sides of the enclosure 102. The reference pixel is the pixel that is imaged on an arbitrarily-selected reference light detector.

The y-position reference member 194 is attached to the enclosure 102 in such a way that the light-reflecting surface lies in an x-z plane where the z axis is an axis orthogonal to the x and y axes established by the x-axis and y-axis guide rails described above. The y-axis reference member 198 does not appear in the view shown in FIG. 3.

The x-axis reference member 198 is attached to the enclosure 102 in such a way that the light-reflecting surface lies in a y-z plane. The x-axis reference member appears in the view shown in FIG. 3 but does not appear in the view shown in FIG. 2.

It is desirable that the pixels lying on an x-axis row of the image-containing medium are imaged successively on the same detector in a detector array as the x-axis transport mechanism scans across the image-containing medium. To ensure that this relationship between rows of pixels and detectors prevails, the optical assembly 174 is tilted slightly from side to side as the x-axis scan takes place in accordance with the measured distance between the reference pixel and the y-distance reference member 194 thereby maintaining a constant distance between the reference pixel (and all other imaged pixels) and the y-distance reference member.

The tilting of the optical assembly 174 is accomplished by the tilting platform 178 which consists of the U-shaped structural member 202 and the y piezoelectric device 206 in the "U" opening. Variations in the voltage applied to the y piezoelectric device 206 cause the distance between the legs of the tilting platform 178 to vary thereby causing the optical assembly 174 to tilt one way or the other.

Variations in the y distance of 5 to 10 micrometers may occur as a result of manufacturing tolerances associated with the lower x-axis transport mechanism 134. Consequently, the range of adjustment provided by the tilting platform 178 should be at least 10 micrometers.

If the variations in the y distance of the optical assembly 174 as the x-axis transport mechanism scans across the image-containing medium are reasonably consistent from one scan to the next, the x and y coordinates of a "reference" pixel may alternatively be measured by means of optically-readable position-indicating scales that are parallel to the x- and y-coordinate axes and reading devices that are carried by the lower x-axis guide-rail transport mechanism 134.

Figure 16:
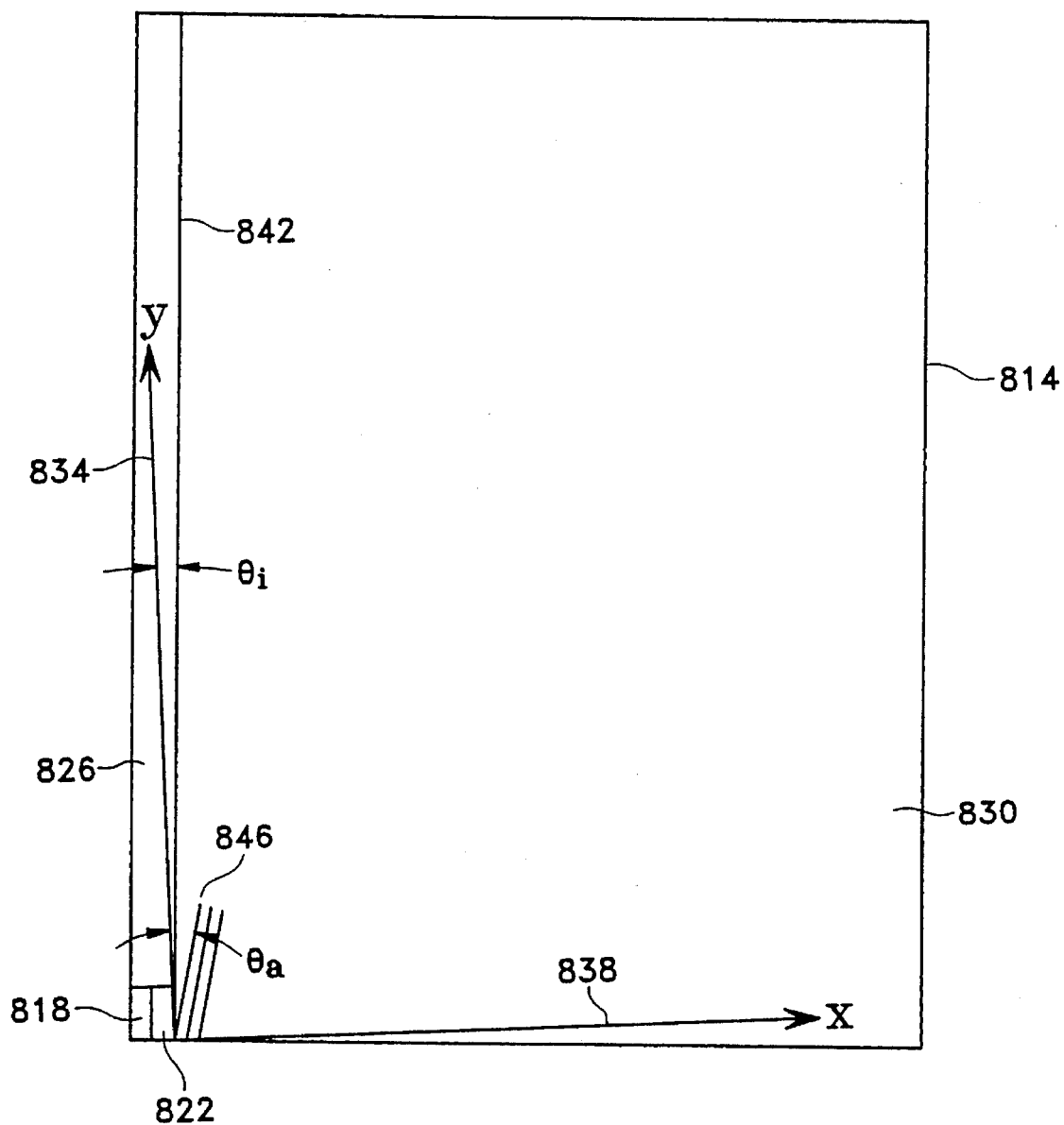
FIG. 16 shows regions of the media support panel that are used in calibrating the light detectors and in determining the values of constants in the equations that relate the coordinates of the pixels imaged on the light detectors to the coordinates of a reference pixel.

For example, the y-axis scale could be a thin strip material attached to the top surface of the transparent media support panel 122 (FIGS. 2 and 3) and running parallel to the edge 842 (FIG. 16) in the detector array alignment region 826 (FIG. 16). The y values could be incorporated in the strip as coded transverse bars, each bar consisting of two sets of 18 segments each. Each segment of the first set would be either reflective or absorptive, the particular sequence of reflective and absorptive segments corresponding to the binary code for its y value. Each segment of the second set would be either reflective or transparent, the particular sequence of reflective and transparent segments corresponding to the same binary code as the first set. The 4 coordinate of the optical assembly 174 (FIGS. 2 and 3) could be determined by reading out either the first or second set of segments that are successively imaged on a particular detector as the optical assembly begins its x scan. The first set of segments would be utilized when the image-containing medium is being illuminated by the reflective media illuminator 574 (FIG. 3). The second set of segments would be utilized when the image-containing medium is being illuminated by the transmissive media illuminator 190 (FIG. 3).

The x-axis scale would be binary coded in the same way as the y-axis scale and mounted on the support frame 170 (FIG. 3) parallel to the x axis, beneath and close to the transparent media support panel 122 (FIG. 3), and within the field of view of the optical system that is part of the optical assembly 174 (FIG. 3). Since the x-axis scale would be mounted below the image-containing medium, the image-containing medium object distance and the x-axis scale object distance would be different as would the corresponding image distances. Consequently, instead of utilizing the detectors associated with reading out the pixels of the image-containing medium, a separate 18-detector linear array mounted at the appropriate image distance would have to be provided to read out the binary x data on the x-axis scale.

The x-axis bearing block assemblies 166 and 186 are respectively driven back and forth along the x-axis double-rail assemblies 162 and 182 by the belt and pulley system shown in FIG. 3. The bearing block belt 210 is a flexible steel belt constrained to follow the path defined by precision pulleys 214, 218, 222, 226, 230, 234, 238, 242, and 246. The cantilevered pulley 238 applies a force normal to the bearing block belt 210 thereby maintaining the belt under a constant tension. The bearing block belt 210 is driven by the reversible motor 250, the power transmission belt 254, and the driving pulley 258 which is affixed to pulley 222. Slippage between the bearing block belt 210 and the pulley 222 as a result of the power transferred to the pulley 222 from the driving pulley 258 is prevented by the large frictional force between the bearing block belt 210 and the pulley 222 that results from the approximate 200 degree angular engagement of the belt and the pulley.

The portion of the bearing block belt 210 extending between the pulleys 214 and 218 is attached to the x-axis bearing block assembly 166 and the portion extending between the pulleys 230 and 234 is attached to the x-axis bearing block assembly 186. The portion of the bearing block belt 210 that extends between the pulleys 222 and 226 moves freely through an aperture in the bearing block assembly 166.

It should be noted that the arrangement of the bearing block belt 210 is such that the x-axis bearing block assemblies 166 and 186 travel in the same direction. The attachment of the bearing block assemblies 166 and 186 to the bearing block belt 210 is accomplished in such a manner that the center of the transmissive media illuminator 190 falls on the optical axis of the optical assembly 174. Thus, the pixels of the image-containing medium that are illuminated by the illuminator 190 are the ones that are imaged by the optical assembly on the detector arrays. Since the two x-axis bearing block assemblies 166 and 186 move together along their respective x-axis double-rail assemblies 162 and 182, each pixel along a row of the image-containing medium receives the same illumination while it is imaged on a particular detector.

The electronics package 262 converts input electrical power to suitable voltage levels for powering the electrical apparatus and electronic circuits and performs the control and signal processing functions necessary for the operation of the high-resolution scanning apparatus.

Figure 4:
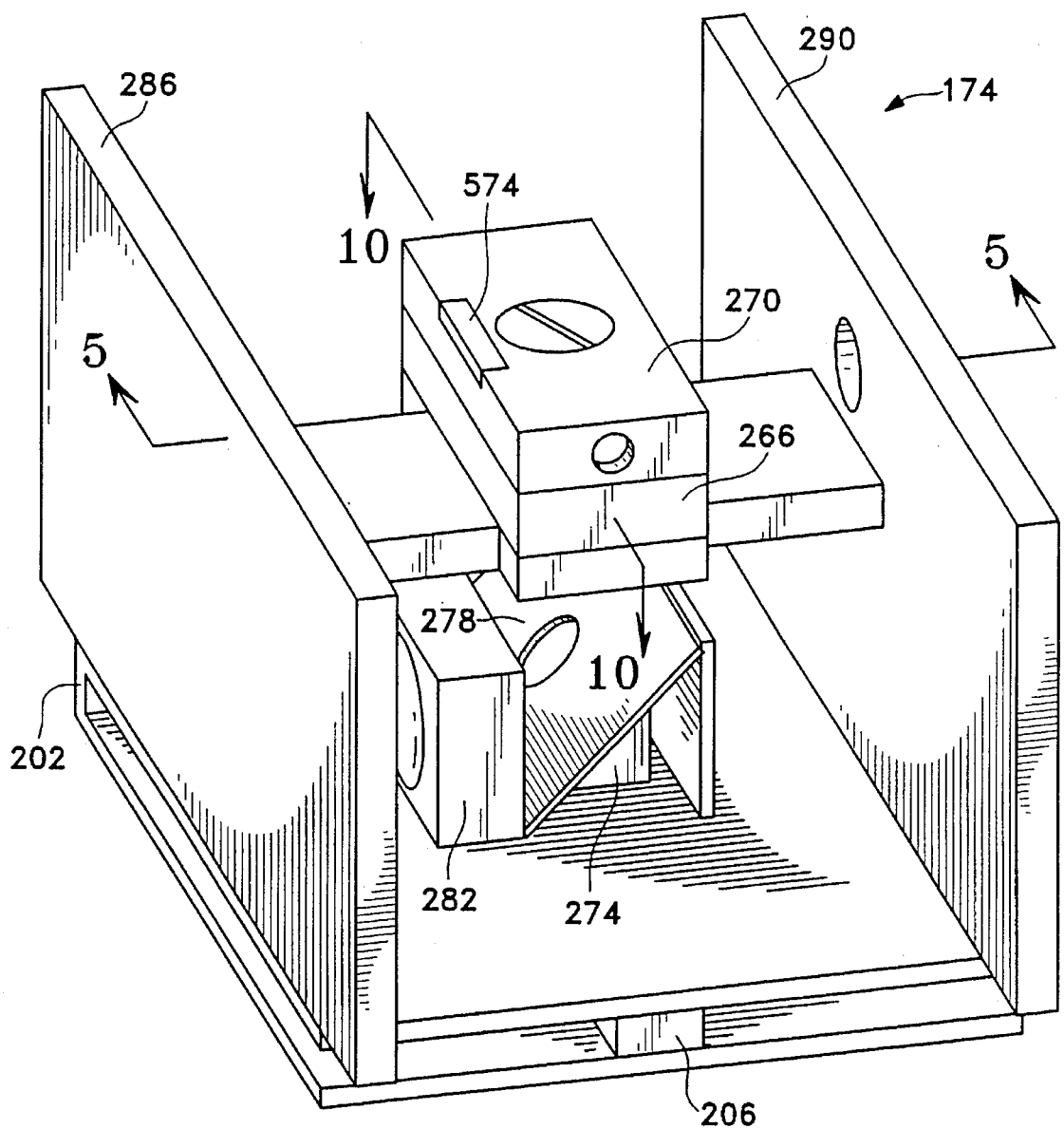
FIG. 4 is an oblique projection of the optical assembly.
Figure 5:
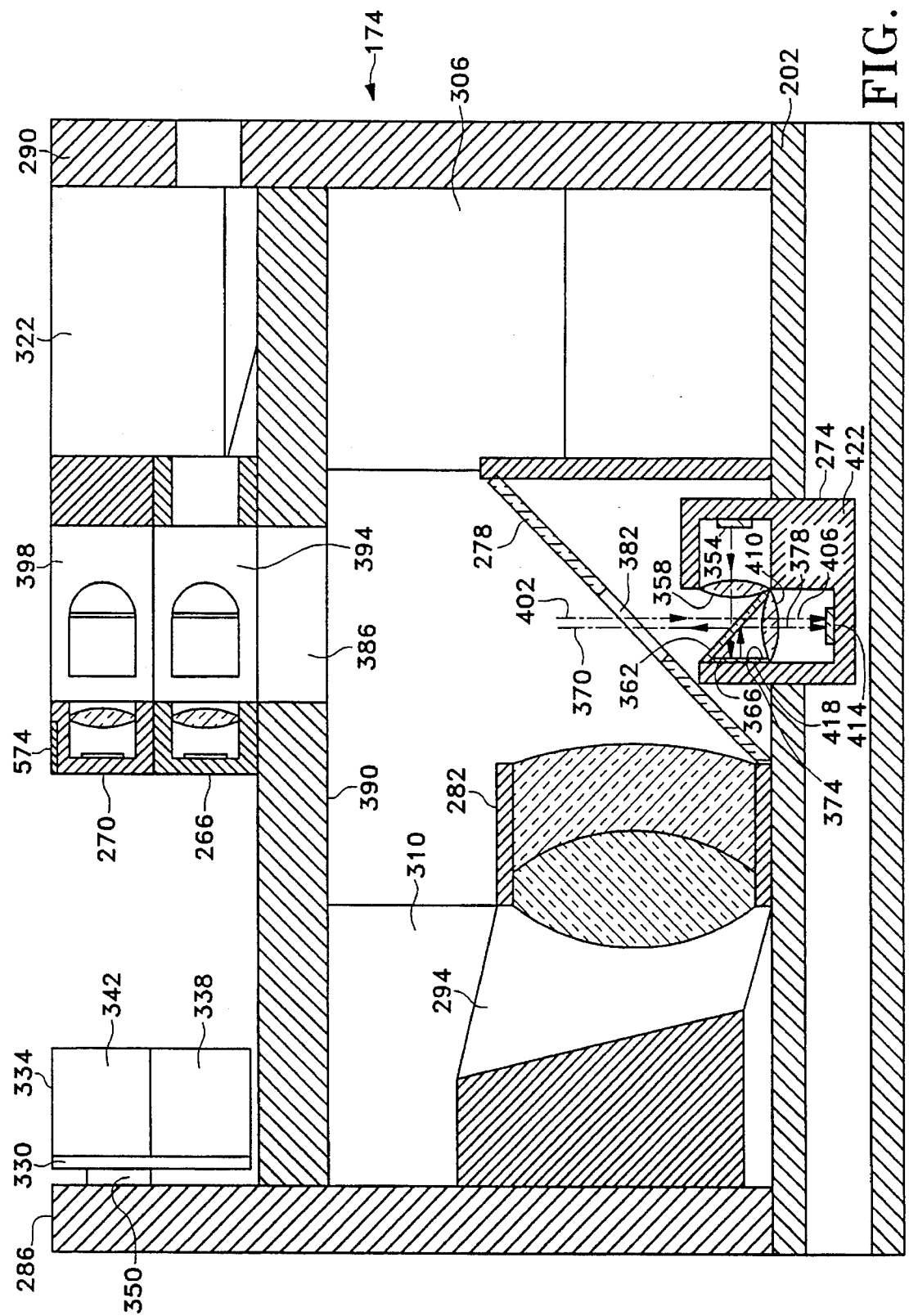
FIG. 5 is a sectional view of the optical assembly taken upon the plane 5—5 of FIG. 4.

An oblique projection of the optical assembly 174, the U-shaped structural member 202, and the y piezoelectric device 206 is shown in FIG. 4 and a sectional view taken upon the plane 5—5 is shown in FIG. 5. The x-axis interferometer 266, the y-axis interferometer 270, and the z-axis interferometer 274 provide distance measurements to the x-distance reference member 198 (FIG. 3), the y-distance reference member 194 (FIG. 2), and the media support panel 122 (FIGS. 2 and 3) respectively.

The x-axis interferometer 266 and the y-axis interferometer 270 are mounted near the object pixels on the medium supported within the media support assembly 118, 122 (see FIG. 3). Thus, measurements of the x-distance and the y-distance by the two interferometers are essentially measurements of the x and y coordinates of the object pixels.

The pixel imaging optical system is comprised of the 45-degree mirror 278, the color-corrected, diffraction-limited lens 282, the path-folding mirrors (not shown in FIG. 4) mounted on end plates 286 and 290, and a detector array assembly located behind the upper left corner of the end plate 286. Light from the illuminated pixels travels downward through the apertures in the interferometers 270 and 266, is reflected by mirror 278 into lens 282, and then travels to the detector array assembly over a path folded into a compact volume by means of the path-folding mirrors.

Figure 6:
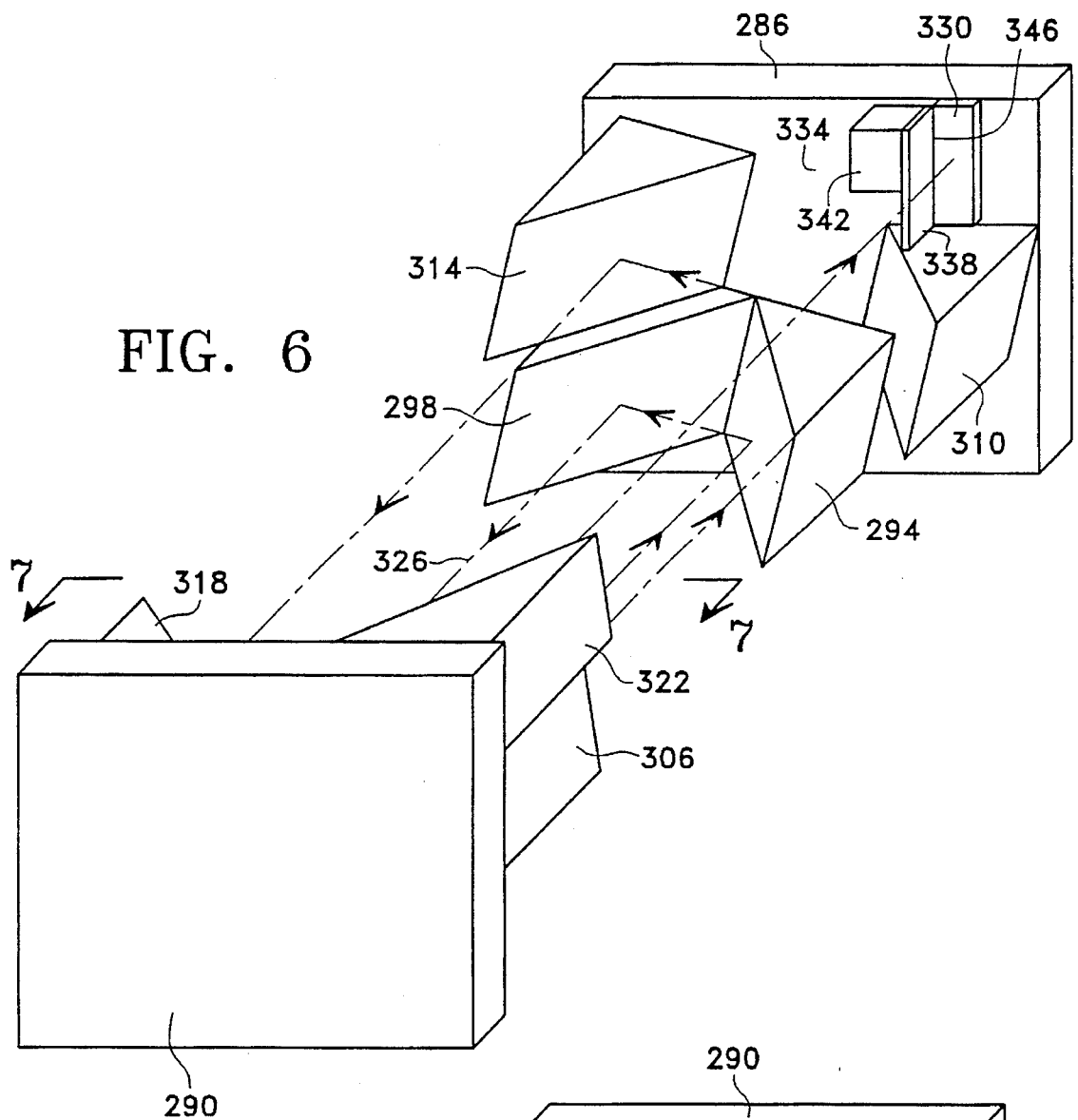
FIG. 6 is an oblique projection of the path-folding 45-degree mirrors mounted on the end plates.
Figure 7:
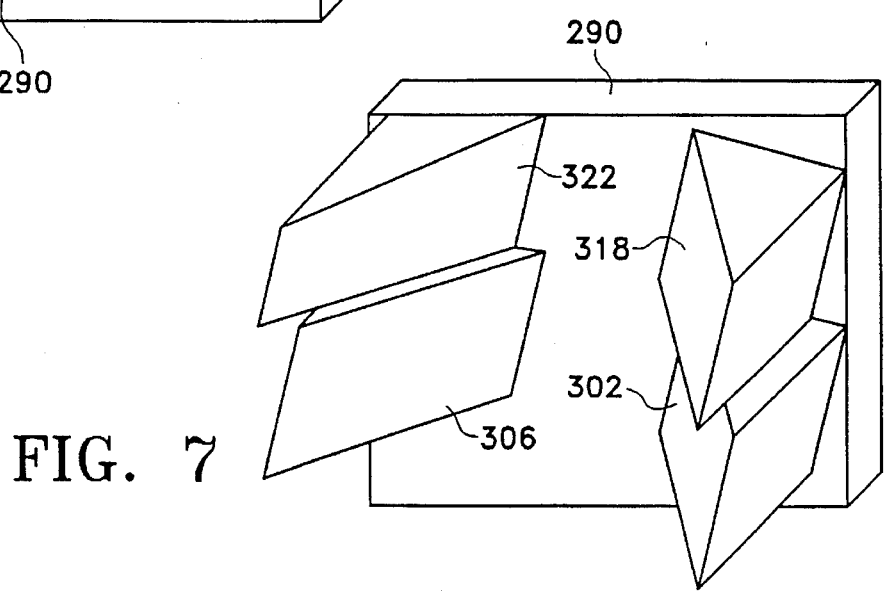
FIG. 7 is a sectional view of the path-folding 45-degree mirrors mounted on the endplates taken upon the plane 7—7 of FIG. 7.

The path-folding 45-degree mirrors 294, 298, 302, 306, 310, 314, 318, and 322 are shown mounted on the end plates 286 and 290 in FIG. 6 and a view taken upon the plane 7—7 is shown in FIG. 7. The light emerging from the lens 282 (FIGS. 4 and 5) is reflected from one mirror to the next, in the order listed above, as illustrated by the central light ray 326, and after the last reflection is imaged on the detector array 330.

The high-resolution scanning apparatus is intended for applications requiring the resolution of pixels spaced less than 2.5 μm apart. To resolve two red pixels spaced say 2 μm apart the angle subtended by the lens at the pixel must be approximately 23 degrees. For a lens having a diameter of 5 cm the object distance, the distance from pixel to lens, should be no greater than about 12.6 cm. Since the detectors in a linear array are typically spaced approximately 12 μm apart, the optical system should have a magnification of 12 μm divided by 2 μm or 6 and the image distance, the distance from lens to detector, must be approximately 75.8 cm. The object and image distances translate into a focal length of approximately 10.8 cm and an f-number for the lens of 10.8 cm divided by 5 cm or 2.2.

The detector array 330 is comprised of three separate linear arrays, each array being comprised of approximately 5000 photodiodes. A red bandpass filter is superimposed on one of the arrays, a blue bandpass filter on a second, and a green bandpass filter on the third. Thus, the first array is sensitive only to red light, the second only to blue light, and the third only to green light.

By using light-emitting diodes (LEDs) having different colors as the media illuminators 190,574 (FIG. 3) and arranging for each LED to illuminate sets of pixels that are imaged on different light detector arrays, the use of color filters on the detector arrays can be avoided.

A narrowband rejection filter tuned to the wavelength of light used by the interferometers is placed immediately in front of all three detector arrays which prevents the light from the interferometers from reaching the detectors without substantially reducing the pixel light that arrives at the detectors.

Each of the detector arrays is associated with a charge-coupled-device (CCD) analog shift register whereby the charges accumulated in the detector potential wells are periodically transferred to the adjoining potential wells of the CCD shift register by application of a transfer pulse. The charges residing in the shift register after transfer are then shifted along the shift register and outputted as voltage levels when they reach the end. While the shift register contents are being shifted out, light-generated charge is accumulated in the detector potential wells in anticipation of the next transfer pulse which occurs after the shift register has been emptied of charge.

A suitable detector array is the Kodak KLI-5603 detector array manufactured by the Microelectronics Technology Division of the Eastman Kodak Company. The KLI-5603 detector array is a high-resolution multispectral array consisting of three separate linear photodiode arrays with 5632 active photosites for the output of red, green, and blue signals.

The three linear arrays in detector array 330 are aligned with columns of pixels, a column of pixels being parallel to the y-axis, and consequently segments of pixel columns of the image-containing medium are imaged on the linear arrays. During any particular detector integration period, one linear array is being exposed to red light emanating from pixels on one column, another linear array is being exposed to green light from pixels on another column, and the third linear array is being exposed to blue light from pixels on a third column. As the optical assembly 174 is transported along the x-axis double-rail assembly 162 (see FIG. 3), the red, green, and blue components of the pixel light for some 5000 rows of the image-containing medium are measured sequentially by column.

An alternative to the diffraction-limited lens that has minimal aberrations for all visible wavelengths is a less expensive lens that is diffraction limited for red, blue, or green light but whose focal length is a function of wavelength. To utilize such a lens in the high-resolution scanning apparatus, the three linear arrays that make up the detector array 330 would form a stair step configuration such that the image distance to each linear array would be in keeping with the constant object distance and the focal length of the lens for the light color to which the linear array is sensitive.

The detector array assembly 334 includes the detector array 330, the pivoting light shield 338, and the light shield actuator 342. The pivoting light shield 338 remains in the position shown in FIG. 6 except when detector dark current is being measured. When dark current measurements are to be made, a solenoid in the shield actuator 342 is energized causing the light shield 338 to pivot about the light shield edge 346 and come into intimate contact with the detector array 330. The part of the light shield 338 that interfaces with the detector array 330 is made of a pliable opaque material that conforms with the surface of the detector array and thereby shields the detector array from any light.

The detector array assembly 334 is mounted on the z piezoelectric device 350 which in turn is attached to the end plate 286. The application of a voltage to the z piezoelectric device 350 causes the device to expand by as much as 10 micrometers thereby shifting the detector array assembly 334 away from the end plate 286 and shortening the distance between the detector array 330 and the lens 282. The distance between the detector array 330 and the lens 282 is adjusted automatically by means of a control circuit and the z piezoelectric device 350 to compensate for any variations in the distance between the lens 282 and the media support panel 122 that may occur during the scanning process thereby avoiding defocusing of the pixel images at the detectors. The aforementioned control circuit generates the voltage applied to the z piezoelectric device 350 on the basis of the distance to the media support panel 122 measured by the z-interferometer 274.

The design of the z-interferometer 274 is shown in FIG. 5. Narrow-band light from the laser diode 354 is converted to a plane wave by the lens 358. The plane wave is split into two equal components by beamsplitter 362, the transmitted reference component 366 and the reflected probe component 370. The reference component 366 is reflected by the mirror 374 and returns to the beamsplitter 362 where it is split into a transmitted component (which can be ignored) and a reflected component 378. The probe component 370 travels to the media support assembly 118, 122 (FIGS. 2 and 3) through the aperture 382 in the 45-degree mirror 278, the aperture 386 in the support member 390, the aperture 394 in the x-interferometer 266, and the aperture 398 in the y-interferometer 270. The media support assembly 118, 122 splits the probe component 370 into a transmitted component (which can be ignored) and a reflected component 402. The reflected component 402 returns to the beamsplitter 362 where it is split into a reflected component (which can be ignored) and a transmitted component 406. The reference component 378 combines with the probe component 406 and the combination plane wave is focused by the lens 410 on the photodetector 414.

The mirror 374 is mounted on the piezoelectric device 418 which in turn is attached to the z-interferometer housing 422. A square-wave voltage signal applied to the piezoelectric device 418 causes the device to expand and contract thereby causing the mirror 374 to move in and out (in a direction normal to the mirror surface) by one-eighth wavelength of the light at the square-wave frequency. As a result, the length of the path traveled by the reference component 378 beginning at the laser diode 354 and ending at the photodetector 414 varies by one-quarter wavelength at the square-wave frequency. If the length of the path traveled by the probe component 406 remains fixed, the relative phase of the reference component 378 and the probe component 406 varies by one-quarter wavelength at the square-wave frequency.

The photodetector 414 provides a measure of the phase difference between the two components by producing an electrical signal that ranges between a maximum when the two components are in phase to a minimum when the two components are out of phase. A narrowband transmission filter centered on the wavelength of the interferometer light is placed over the photodetector 414 so as to minimize the effects of any pixel light that arrives at the photodetector.

The reference component 378 travels a path from the laser diode 354 to the photodetector 414 that remains fixed in length except for the variations introduced by the piezoelectric device 418. The probe component 406 travels a path between the same beginning and end points that may vary slightly in length because of mechanical imperfections in the x-axis and y-axis transport mechanisms 134, 130. Thus, in the absence of the phase modulation introduced by the piezoelectric device 418, the two components 378 and 406 will move in and out of phase as the distance to the media support assembly 118, 120 increases or decreases. The change in the distance between the z-interferometer 274 and the media support assembly 118, 120 can be monitored by accumulating with regard to sign the half-cycle changes in phase as the two components 378 and 406 move in and out of phase.

Figure 8:
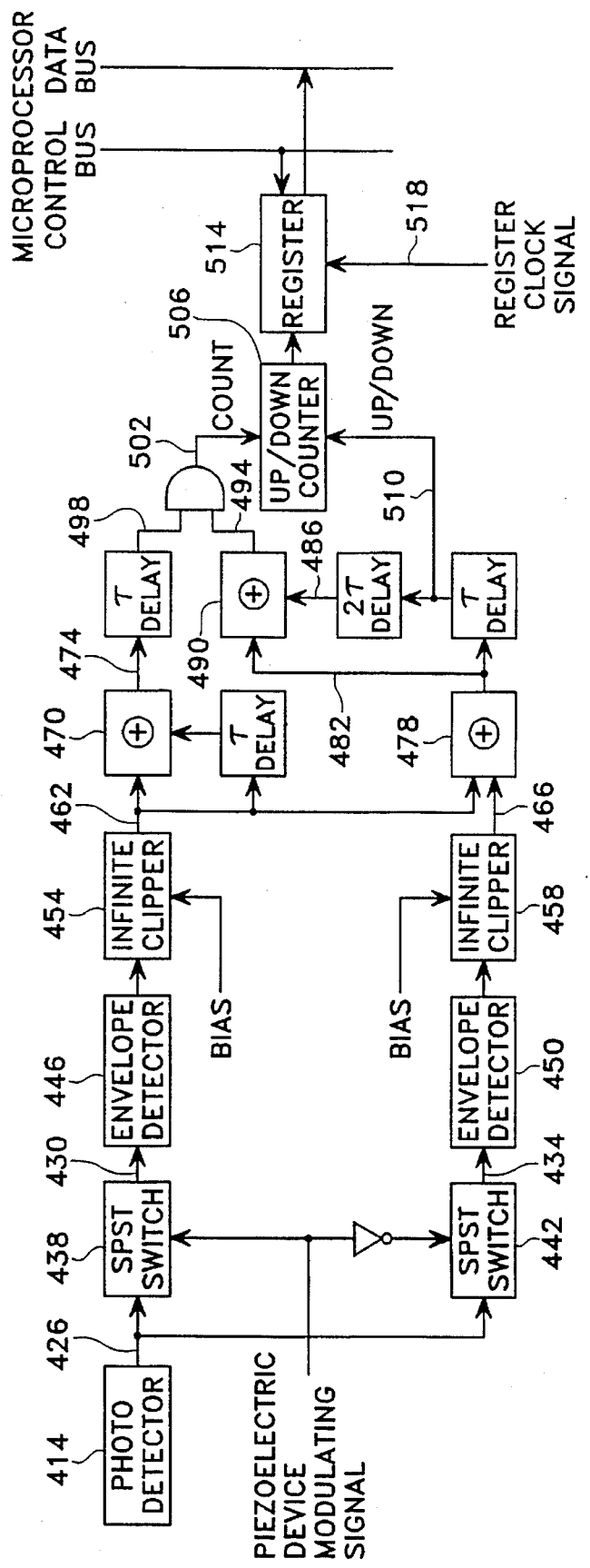
FIG. 8 is a block diagram of the z-interferometer processor.

The accumulation of half-cycle changes in phase is accomplished by the z-interferometer processor 424 shown in FIG. 8. The output signal from the photodetector 414 when the distance between the z-interferometer 274 and the media support assembly 118, 120 (FIGS. 2 and 3) is increasing steadily is the square wave 426 shown in FIG. 9. The odd-numbered levels 430 and the even-numbered levels 434 of the square wave 426, the levels being numbered from left to right beginning with one, are bounded by a sine wave and a cosine wave respectively. The shifting back and forth between odd and even levels is produced by the phase modulation of the reference component 378 (FIG. 5) that results from applying the square-wave voltage signal to the z piezoelectric device 350.

The odd levels 430 and the even levels 434 (FIG. 9) are gated through SPST switches 438 and 442 respectively (FIG. 8), the two switches being controlled by the piezoelectric device modulating signal and its inverse. The envelopes of the odd levels 430 and the even levels 434 (FIG. 9) are then obtained by envelope detectors 446 and 450 respectively (FIG. 8). The signals from the envelope detectors are passed through infinite clippers 454 and 458 which convert the biased input signals into square waves 462A and 466A (FIG. 9) while maintaining the same bias crossings. The bias levels are set roughly half way between the anticipated maximum and minimum values of the photodetector output signal.

To better illustrate the process, it is assumed for the lower groups of waveforms in FIG. 9 that the distance to the media support assembly 118, 122 (FIGS. 2 and 3) first increases and then decreases. The first group of waveforms are identified by numbers to which the letter A has been appended. The second group of waveforms are identified by numbers to which the letter B has been appended. A number designating an output signal in FIG. 8 stands for either. The square wave 462A has experienced a bias crossing just before the distance starts to decrease and a reverse bias crossing τ seconds late. This particular situation is chosen for illustration in that it presents a challenge to the signal processing circuitry insofar as maintaining an accurate half-cycle count of the change in phase as the distance increases and decreases over time.

The square wave 462A is added to a τ-delayed version of itself by the modulo 2 adder 470 with the resulting pulse train 474A shown in FIG. 9. Each pulse of the pulse train 474A corresponds to a bias crossing of the output signal from the envelope detector 446 (FIG. 8) and represents an accumulated change in phase between the two components 378 and 406 (FIG. 5) of one-half cycle. It should be noted that two bias crossings are indicated by the two transitions occurring in close succession near the center of square wave 462A (FIG. 9). The interval between transitions was so short, however, that the square wave 474A failed to record it. Thus, if the pulses of pulse train 474A were counted, the accumulated count would not be an accurate measure of the change in phase that had occurred. The square wave 462A indicates that from one end to the other there has been no change in phase. However, pulse train 474A suggests that there have been two positive half-cycle changes in phase and one negative half-cycle change for a net positive half-cycle change in phase.

Any circuit for counting transitions in a square wave will fail to count a transition that follows a prior transition within a time interval $\tau$ where $\tau$ depends on the response times of the semiconductor devices used in the counting circuit. Thus, there is a risk of an inaccurate transition count unless some means is provided for compensating for missed transitions.

The solution to the problem of not detecting a bias crossing that occurs shortly after a prior bias crossing is to gate the square wave 474A in such a way as to eliminate a pulse that records the occurrence of a bias crossing that is closely followed by a reverse bias crossing. The accumulated count of the pulses in the gated pulse train then provides an accurate measure of the phase change except for the very brief intervals when a bias crossing is closely followed by a reverse bias crossing.

The gating signal is obtained in the following way. First, the square wave 462A is added to the square wave 466A by the modulo 2 adder 478 thereby generating the square wave 482A. Then the square wave 482A is delayed by $3\tau$ to obtain square wave 486A. Finally, the addition of square waves 482A and 486A by modulo 2 adder 490 (FIG. 8) results in the pulse train 494A (FIG. 9).

The pulse train 498A, obtained by delaying pulse train 474A by $\tau$, is AND'ed with pulse train 494A (see FIG. 8) to give the pulse train 502A, the pulses of which are accumulated in the up/down counter 506 (FIG. 8). It should be noted that the middle pulse of pulse train 474A, which recorded a bias crossing that was followed shortly thereafter by a reverse bias crossing, is eliminated in the pulse train 502A.

The direction of counting for up/down counter 506 (FIG. 8) is controlled by the square wave 510A which is obtained by delaying the square wave 482A by $\tau$. If the square wave 510A is high just before a pulse of pulse train 502A, the up/down counter 506 counts up. If the square wave 510A is low, the up/down counter 506 counts down. Thus, the square wave 510A causes the up/down counter 506 to count up when the first pulse of pulse train 502A occurs and down when the second pulse occurs, the change in count after the two pulses have occurred being zero, as it should be.

A slightly different situation is illustrated in FIG. 9 beginning with square waves 462B and 466B. The bias crossing that occurs while the distance is increasing is followed after a $2\tau$ interval by a reverse bias crossing that occurs while the distance is decreasing. The waveforms 474B through 510B follow from square waves 462B and 466B as before.

The bias crossing and the reverse bias crossing that follows after a $2\tau$ time interval are spaced sufficiently far apart in time to be recorded as a pair of pulses near the center of the pulse train 502 B. Since square wave 510B is high just before the first pulse of the pair occurs, the first pulse results in the up/down counter 506 being incremented. Since the square wave 510B is low just before the second pulse of the pair occurs, the second pulse results in the up/down counter 506 being decremented. Thus, the count registered by the up/down counter after the four pulses of pulse train 502B have been counted remains the same as it was before.

There are many possible ways of preventing the counting of either of two closely-spaced transitions which are equivalent in function to the circuit shown in FIG. 8. These other ways should be considered to be alternative embodiments of the transition-counting circuitry of the present invention.

The contents of the up/down counter 506 are clocked into the register 514 periodically by the register clock signal 518 which has a frequency of at least 10 kHz.

Figure 10:
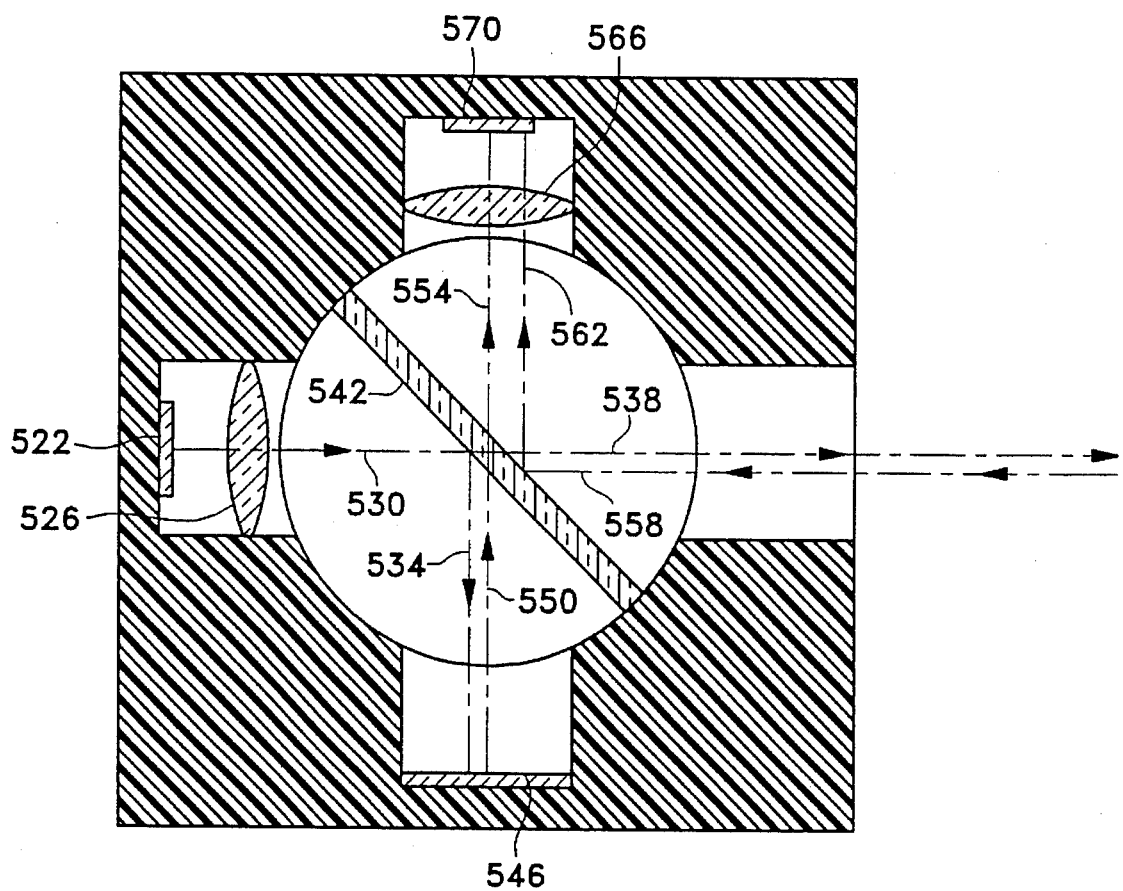
FIG. 10 is a sectional view of the x-axis interferometer taken upon the plane 10—10 of FIG. 4.

The x-axis interferometer 266 (FIG. 4) and the y-axis interferometer 270 (FIG. 4) are essentially identical. A sectional view of the x-axis interferometer 266 taken upon the plane 10—10 is shown in FIG. 10. Monochromatic light that emerges from the laser diode 522 is collimated by the lens 526 and the resulting plane wave 530 is split into two components—the reflected reference wave 534 and the transmitted probe wave 538—by the beamsplitter 542.

The reference wave 534 travels to the mirror 546 and returns as the wave 550 to the beamsplitter 542 where it is split into the transmitted wave 554 and the reflected wave which can be ignored.

The probe wave 538 travels to the x-distance reference member 198 (FIG. 3), is reflected, and returns as the wave 558 to the beamsplitter 542 where it is split into a reflected wave 562 and a transmitted wave which is can be ignored. The reference wave 554 and the probe wave 562 combine in a phase relationship that depends on the difference in distances traveled by the two waves since leaving the laser diode 522. The combined wave consisting of the reference wave 554 and the probe wave 562 is focused by lens 566 on the photodetector 570 which produces an electrical signal that is a maximum when the two waves 554 and 562 are in phase and a minimum when the two waves are out of phase.

The change in distance between the x-axis interferometer 266 and the x-distance reference member 198 during scanning can be determined by counting the occasions when the photodetector output signal goes from high to low and from low to high. Each time the photodetector output signal makes the high-to-low or low-to-high transition represents a change in distance of one-quarter wavelength of the light beam. The counting of the half-cycle phase changes between the two waves 554 and 562 is accomplished by circuitry similar to that shown in FIG. 8.

The operation of the y-axis interferometer 270 is similar to the x-axis interferometer 266 except that it involves reflections of the light wave from the y-distance reference member 194. For both the x-axis interferometer and the y-axis interferometer, the register clock signal 518 (FIG. 8) is the signal that causes the transfer of charge between the detector array and the CCD analog shift register. Thus, each time the detector array is read out, corresponding values for the x and y distances are available.

Mounted in the top of the y-axis interferometer 270 (FIG. 3) close to the pixels that are imaged on the detector array is the reflective media illuminator 574. The reflective media illuminator 574 can be either a halogen lamp or three light-emitting diodes having different colors.

Figure 11:
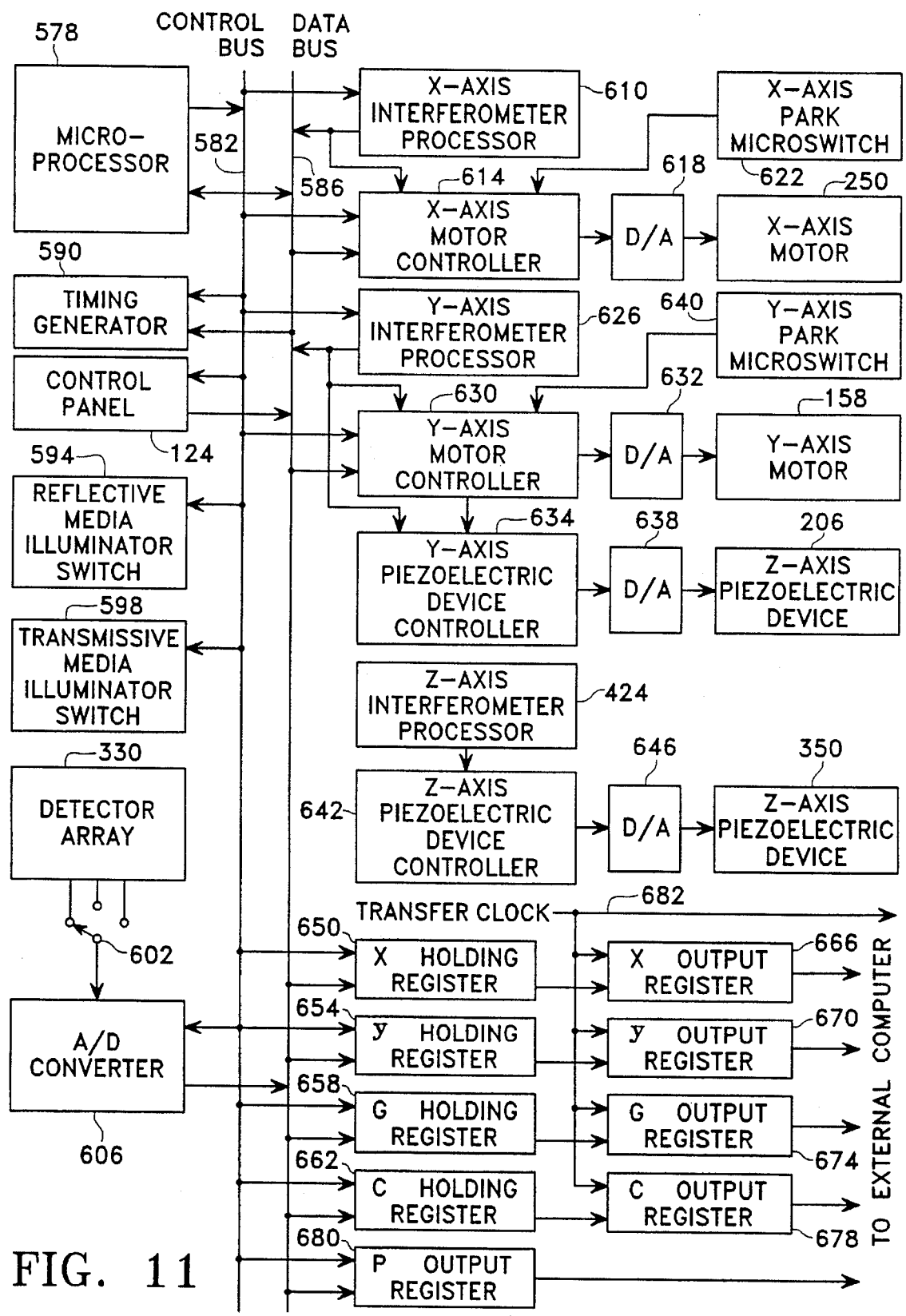
FIG. 11 is a block diagram of the processing electronics for the high-resolution scanning apparatus.

The processing electronics for the high-resolution scanning apparatus shown in FIG. 11 is contained in the electronics package 262 (FIG. 3). The operation of the scanning apparatus is controlled by the microprocessor 578 by means of the control bus 582 and the data bus 586. A word placed on the control bus 582 by the microprocessor 578 operates as a command to a particular unit to perform a particular function such as placing data on the data bus 586 for the microprocessor to read or reading data that was placed on the data bus by the microprocessor. The microprocessor 578 is alerted to an immediate processing need by interrupt signals (not shown in the figure) from the control panel 124 and the timing generator 590. Commercially available microprocessors that can perform the functions of the microprocessor 578 are Intel's 80386 and Motorola's 60030.

The user of the scanning apparatus interfaces with the microprocessor 578 by means of the control panel 124. The control panel 124 provides the means for turning power on, for selecting either the transmissive media or reflective media mode of operation, for selecting the calibrate mode or the operate mode of operation, and for selecting a particular rectangular region to be scanned. Alternatively, some or all of these control functions could be exercised by the user of the apparatus by means of an external computer.

All timing signals necessary for the operation of the apparatus are generated by the timing generator 590. The interconnection of the timing generator 590 and the units which utilize timing signals generated by the timing generator are not shown in the figure.

The reflective media illuminator switch 594 and the transmissive media illuminator switch 598 turn the reflective media illuminator 574 (FIG. 3) and the transmissive media illuminator 190 (FIG. 3) respectively on or off and are under the control of the microprocessor 578.

The three CCD analog shift registers associated with the three linear detector arrays that comprise the detector array 330 output through three ports that are sequentially and periodically connected by means of the single-pole triple-throw switch 602 to the analog-to-digital (A/D) converter 606. The switching of switch 602 is automatically accomplished by a timing signal supplied by timing generator 590 at a rate three times higher than the transfer rate from each linear detector array to its associated CCD shift register.

The analog CCD shift register outputs are converted to digital representations by the A/D converter 606. The results of the A/D conversion process are read by the microprocessor 578 as they become available.

The x-axis interferometer processor 610 keeps track of the round-trip distance between the x-axis interferometer 266 and the x-distance reference member 198 in half-cycle increments. This distance can be accessed by the microprocessor 578 and is also made available to the x-axis motor controller 614.

The x-axis motor 250 is caused to drive the optical assembly 174 either to within a predetermined range of a desired x-distance or at a desired x-velocity by the microprocessor 578 writing the desired x-distance or the desired x-velocity into a register in the x-axis motor controller 614. In the positioning mode of operation, the x-axis motor controller 614 supplies current via the digital-to-analog (D/A) converter 618 to the x-axis motor 250 based on (1) the difference between the desired x-distance and the measured x-distance provided by the x-axis interferometer processor 610 and (2) the rate of change of the measured x-distance. In the velocity-maintenance mode of operation, the x-axis motor controller 614 supplies current to the x-axis motor 250 based on the rate of change of the measured x-distance alone.

The x-axis park microswitch 622 is activated whenever the optical assembly 174 reaches the x-axis "park" position—the far left position in FIG. 3 where the ends of the x-axis bearing block assembly 186 and the x-axis double rail assembly 182 are aligned. The activation of the x-axis park microswitch 622 causes the x-motor controller to stop the x-axis motor 250.

The y-axis interferometer processor 626 keeps track of the round-trip distance between the y-axis interferometer 270 and the y-distance reference member 194 in half-cycle increments. This distance can be accessed by the microprocessor 578 and is also made available to the y-axis motor controller 630 and the y-axis piezoelectric device controller 634.

The y-axis motor 250 is caused to drive the support frame 170 (FIG. 2) to within a predetermined range of the desired y-distance by the microprocessor 578 writing the desired y-distance into a register in the y-axis motor controller 630. When the motion of the support frame 170 ceases, the zero rate of change of the measured y-distance alerts the y-axis motor controller 630 to turn off the power to the y-axis motor 158 (FIG. 2) and to activate the y-axis piezoelectric device controller 634.

The y-axis piezoelectric device controller 634 then applies a voltage based on the difference between the measured and desired y-distances to the y-axis piezoelectric device 206 (FIG. 4) via the digital-to-analog (D/A) converter 638 causing the piezoelectric device to expand or contract thereby tilting the optical assembly 174 until a position is reached where the measured and the desired y-distances are equal.

The equality of the measured and the desired y-distances are maintained by the y-axis piezoelectric device controller 634 as the optical assembly 174 (FIG. 3) is moved parallel to the x-axis by the lower x-axis transport mechanism 134.

The y-axis park microswitch 640 is activated whenever the support frame 170 (FIG. 2) reaches the y-axis "park" position—the far right position in FIG. 2 just before the optical assembly 174 makes contact with the end wall of the enclosure 102. The activation of the y-axis park microswitch 640 causes the y-axis motor controller 630 to stop the y-axis motor 158.

As the optical assembly 174 (FIGS. 2 and 3) scans the image-containing medium, the object distance (i.e. the distance from the object pixels to the lens 282) may vary to such a degree as to exceed the depth of focus of the lens. In order to compensate for any variations in the object distance, the image distance (i.e. the distance between the detector array 330 (FIG. 5) and the lens 282 (FIG. 5)) is adjusted by means of the z-axis piezoelectric device 350 (FIG. 5).

A table of values relating the z-distance measured by the z-axis interferometer (which is linearly related to the object distance) and the voltage to be applied to the z-axis piezoelectric device 350 to achieve the appropriate image distance are stored in the z-axis piezoelectric device controller 642. During scanning, the z-axis piezoelectric device controller 642 translates the z-distance supplied by the z-axis interferometer 274 to a voltage which it supplies via the digital-to-analog (D/A) converter 646 to the z-axis piezoelectric device 350. The z-axis piezoelectric device 350 expands or contracts as the object distance varies thereby keeping the object pixels imaged on the infrared light detectors.

For each pixel scanned the microprocessor 578 outputs the x and y coordinates of the pixel and pixel light intensity G as a function of light color c. The data is placed in x holding register 650, y holding register 654, G holding register 658, and c holding register 662 as it becomes available. The data held in the holding registers 650, 654, 658, and 662 are transferred by the transfer clock signal 682 from the timing generator 590 to the x, y, G, and c output registers 666, 670, 674, and 678 just prior to the availability of new data. The aforementioned output registers are accessible to an external computational facility which is alerted each time new data becomes available by the transfer clock signal 682.

Figure 12:
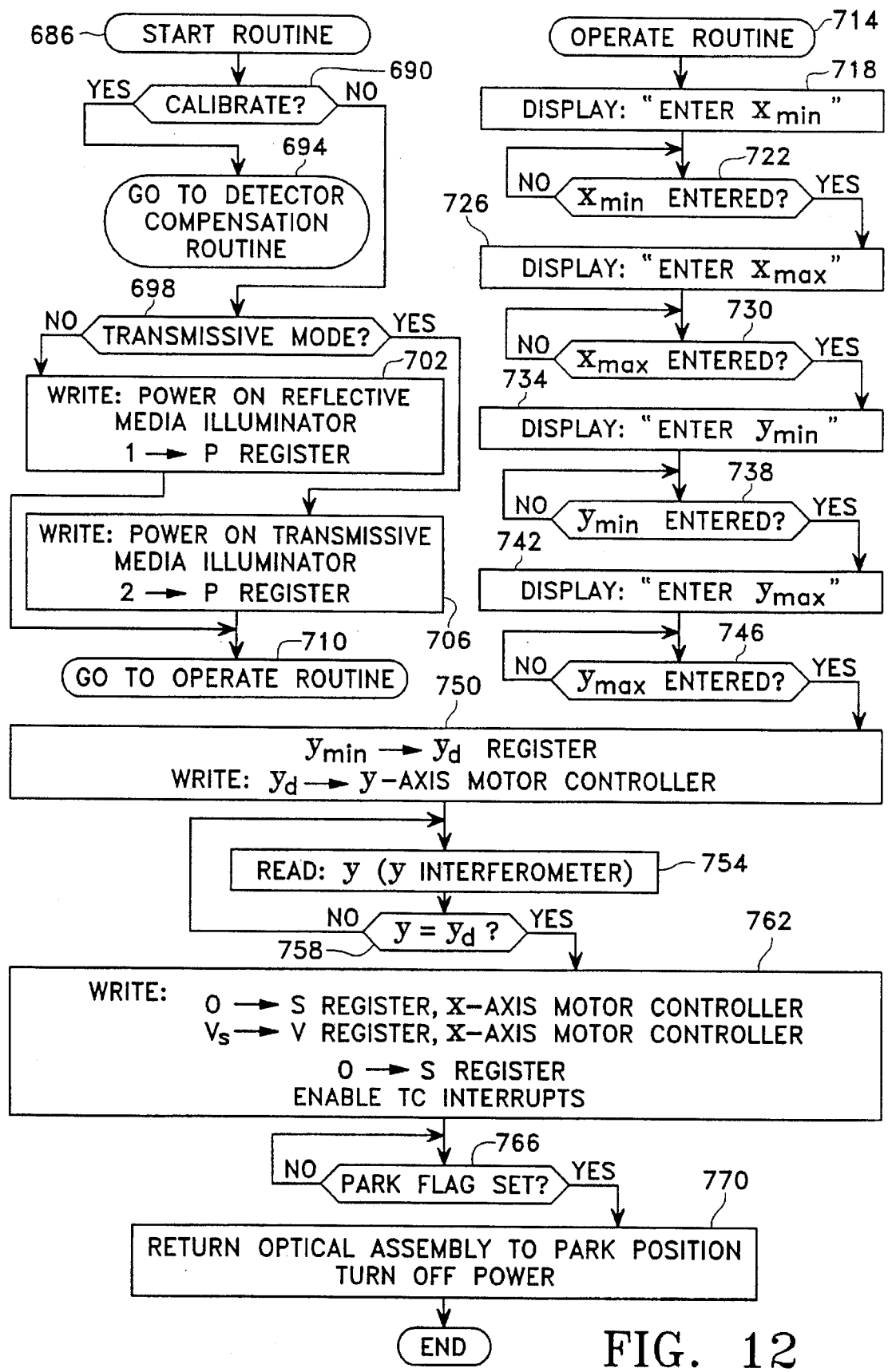
FIG. 12 is the flow diagram that shows the operations performed by the microprocessor.

The operations of the microprocessor 578 are governed by the flow diagrams shown in FIG. 12. When the user presses the "power on" switch, the microprocessor is initialized. When the user presses the "start" switch, the microprocessor is directed to the start 686 of the main program shown at the top left of FIG. 12. The microprocessor first performs the test 690 to determine the state of the operate/calibrate switch on the control panel 124 (FIGS. 1 and 11). If the operate/calibrate switch is set to "calibrate", the microprocessor goes to the detector compensation routine 694. If the switch is set to "operate", the microprocessor performs the test 698 to determine the state of the transmissive/reflective media switch on the control panel 124 (FIGS. 1 and 11).

If the transmissive/reflective media switch is set to "reflective media", the microprocessor performs operation 702 and writes a command to the reflective media illuminator switch 594 (FIG. 11) turning the reflective media illuminator 574 (FIGS. 3, 4, and 5) on and enters 1 into the p register. If the media switch is set to "transmissive media", the microprocessor performs operation 706 and writes a command to the transmissive media illuminator switch 598 (FIG. 11) turning the transmissive media illuminator 190 (FIG. 3) on and enters 2 into the p register.

The values of p stored in the p register indicate the mode of operation of the scanning apparatus. A p value of 0 indicates that the detector array 330 is shielded by the light shield 338 (FIG. 6). A p value of 1 indicates that the reflective media illuminator is turned on. A p value of 2 indicates that the transmissive media illuminator is turned on.

After performing operations 702 or 706 the microprocessor executes the "goto" command 710 to the operate routine 714 shown at the top right of FIG. 12.

The microprocessor causes the message "enter $x_{min}$" to be displayed 718 on the control panel 124 (FIGS. 1 and 11) which instructs the user to enter the x coordinate of the left edge of the region of the image-containing medium to be scanned. The microprocessor waits for $x_{min}$ to be entered 722 and then causes the message "enter $x_{max}$" to be displayed 726 on the control panel, $x_{max}$ being the x coordinate of the right edge of the region to be scanned.

When the user has completed the entry of $x_{max}$ 730, the microprocessor causes the message "enter $y_{min}$" to be displayed 734 on the control panel which instructs the user to enter the y coordinate of the bottom edge of the region to be scanned.

When the user has completed the entry of $y_{min}$ 738, the microprocessor causes the message "enter $y_{max}$" to be displayed 742 on the control panel, $Y_{max}$ being the y coordinate of the top edge of the region to be scanned.

When the user has completed the entry of $y_{max}$ 746, the microprocessor writes $y_{min}$ to the y-axis motor controller 630 (FIG. 11) thereby causing the y-axis controller to drive the y-axis transport mechanism 130 (FIG. 2) to the vicinity of coordinate $y_{min}$ 750 whereupon the y-axis piezoelectric device controller tilts the optical assembly 174 (FIG. 2) until y equals $y_{min}$.

The microprocessor reads y 754 and compares y with $y_{min}$ 758, repeating the sequence of operations until y equals $y_{min}$. Then it performs the operations 762. It writes 0 into the s (scan direction) register and the scan velocity $v_s$ into the v (scan velocity) register of the x-axis motor controller 614 (FIG. 11) thereby instructing the controller to scan in the direction of increasing x at a constant velocity $v_s$. The microprocessor stores the scan direction 0 in the s register and enables the TC interrupts.

The scanning of an image-containing medium is accomplished by the TC and SC interrupt routines which will be discussed later. When the final x scan has been completed, a "park" flag is set which tells the microprocessor that the scanning process has been completed.

The microprocessor waits 766 for the "park" flag to be set and then performs the operations 770 returning the optical assembly to its park position and turning off the transmissive media illuminator 190 (FIG. 3) or the reflective media illuminator 574 (FIG. 3), whichever is turned on.

Figure 13:
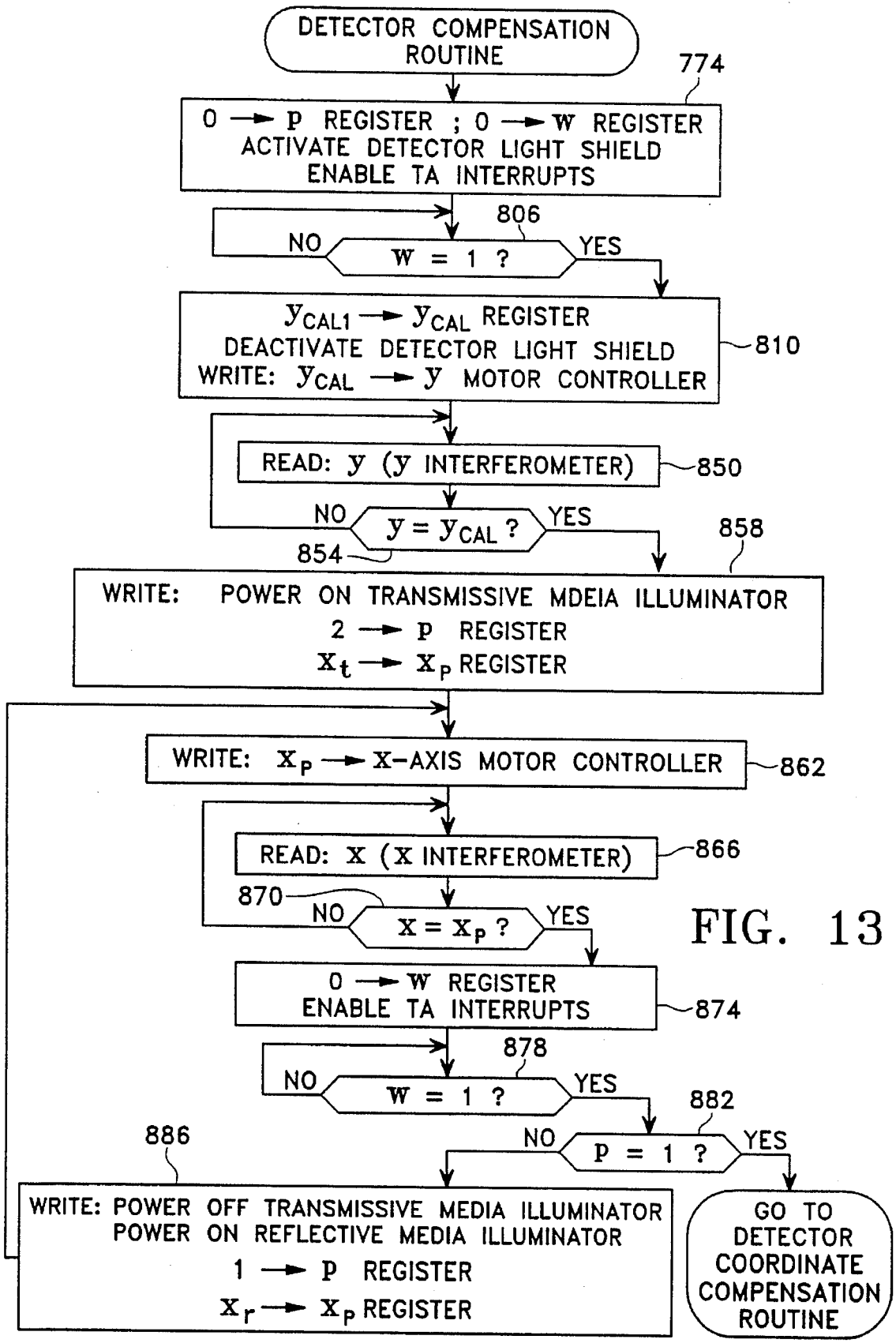
FIG. 13 is the flow diagram for the detector compensation routine.

If the operate/calibrate switch is set to "calibrate", the comparison operation 690 causes the microprocessor to go to the detector compensation routine 694 shown in FIG. 13. The microprocessor performs the operations 774 consisting of entering 0's into the p and w registers, activating the detector light shield actuator 342 thereby causing the pivoting light shield 338 to cover the detector array 330 (see FIG. 6), and enabling the TA interrupts. The dark current for all of the detectors in the detector array are measured while the detector array is shielded from ambient light by the light shield.

Figure 14:
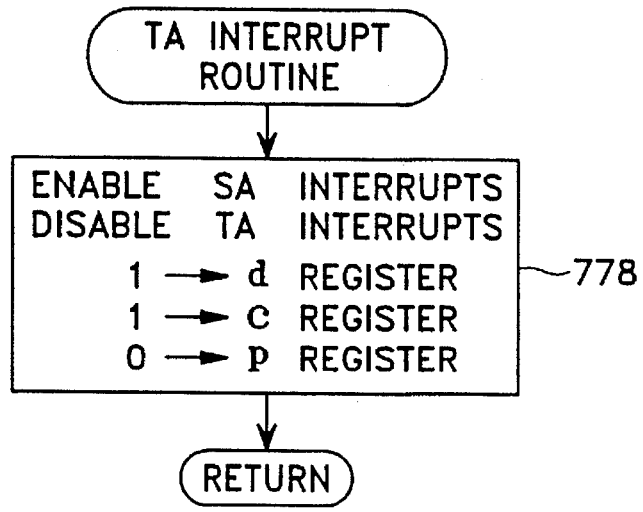
FIG. 14 is the flow diagram for the TA interrupt routine.

The TA interrupt signal is the square-wave signal supplied by the timing generator 590 (FIG. 11), the low-to-high transition of which causes the transfer of the contents of the three linear detector arrays that comprise detector array 330 (FIG. 6) to the associated CCD shift registers. When the rising transition of the TA interrupt signal occurs, the microprocessor immediately performs the operations 778 of the TA interrupt routine shown in FIG. 14. The SA interrupts are enabled, the TA interrupts are disabled, 1's are entered into the d and c registers, and a 0 is entered into the p register.

The d parameter identifies the detector whose output is currently being processed. The detectors in each of the three linear arrays that comprise the detector array 330 (FIG. 6) are numbered from 1 to D, the number 1 being assigned to the detector whose output emerges first from the associated CCD analog shift register and D being the number of detectors in each linear array.

The c parameter takes on the values 1, 2, and 3 and identifies the light color to which the d detector was exposed.

The SA interrupt signal is a square wave supplied by the timing generator 590 (FIG. 11), the rising transition of which coincides with the availability from the A/D converter 606 (FIG. 11) of a digitized value of the output of detector d that was exposed to the light color c. The first rising transition of the SA interrupt signal after enablement of the SA interrupts corresponds to d=1 and c=1, the second transition corresponds to d=1 and c=2, the third corresponds to d=1 and c=3, and the fourth corresponds to d=2 and c=1. The pattern continues until all of the detector outputs have been digitized by the A/D converter.

Figure 15:
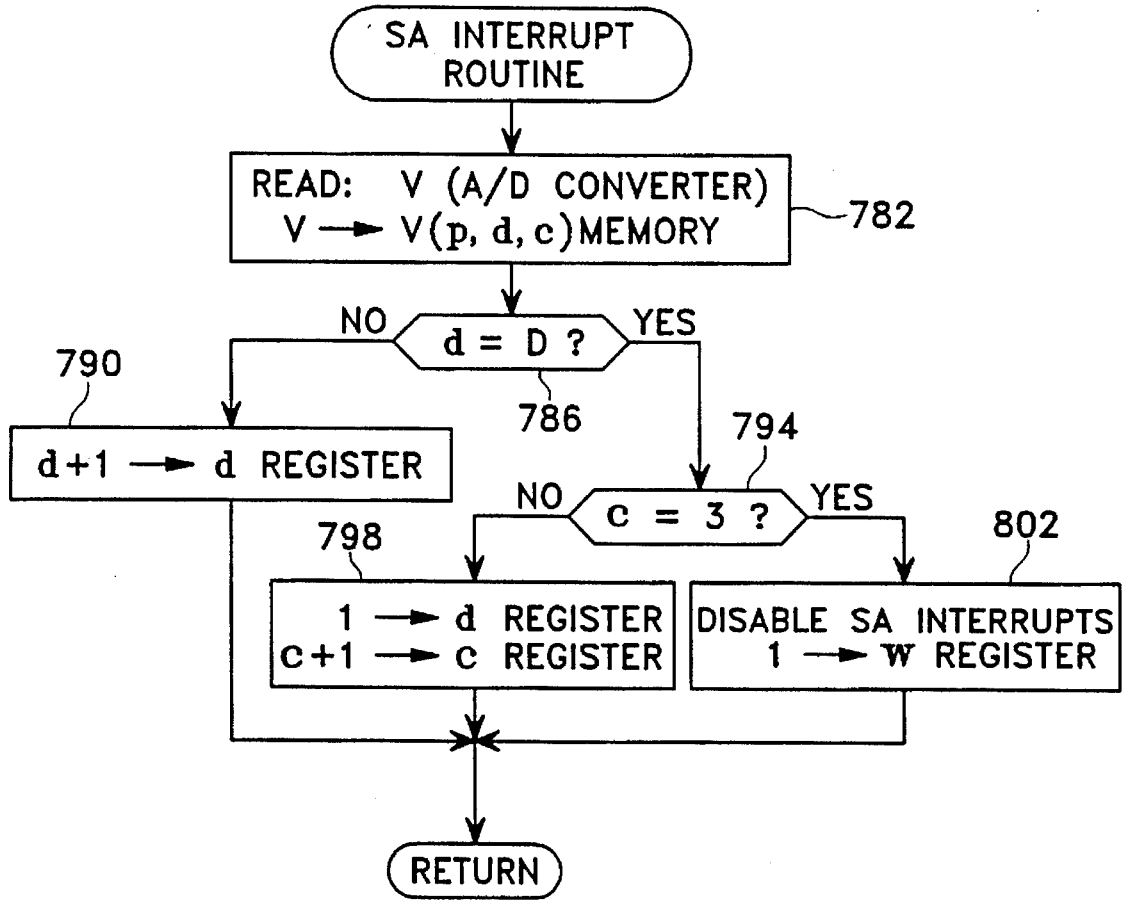
FIG. 15 is the flow diagram for the SA interrupt routine.

The rising transition of the SA interrupt signal causes the microprocessor to immediately perform the SA interrupt routine shown in FIG. 15 after completion of the TA interrupt routine triggered by the prior TA interrupt signal. The first operations performed 782 are the reading of the output V from the A/D converter 606 (FIG. 11) and the storing of that value at an address in memory uniquely determined by the values of p=0, d, and c. The voltages stored in memory as a result of the present process are the detector voltages that arise from the dark currents in the detectors since the detectors are shielded from ambient light when these detector readings are made.

The microprocessor then compares d with D 786 where D is the number assigned to the last detectors in the three linear detector arrays. If d is not equal to D, the d register is incremented 790 and the microprocessor returns to the detector compensation routine shown in FIG. 13.

If d is equal to D, then c is compared 794 with 3. If c is not equal to 3, a 1 is entered into the d register and the c register is incremented 798. If c is equal to 3, output values from the A/D converter have been obtained for all detectors. The SA interrupts are disabled and a 1 is entered into the w register 802. The microprocessor then returns to the detector compensation routine shown in FIG. 13.

When the microprocessor determines that w equals one 806, it performs the operations 810 of entering $y_{call}$ into the $y_{call}$ register, deactivating the light shield actuator 342 thereby causing the light shield 338 to uncover the detector array 330 (see FIG. 6) and writing $y_{cal}$ to the y-axis motor controller 630 (FIG. 11). The quantity $y_{call}$ is the y coordinate to which the support frame 170 (FIG. 2) is initially driven for calibration.

Regions of the media support panel 122 (FIG. 1) important for the calibration process are shown in FIG. 16. The rectangular outline 814 identifies the perimeter of the media support panel 122 that can be exposed to both reflective and transmissive media illumination and that can be imaged on the detector array 330 (FIG. 6) during the scanning process. The transmissive media calibration region 818 is a region of uniform transmissivity. The reflective media calibration region 822 is a region of zero transmissivity and uniform reflectivity. The detector array alignment region 826 is a region of zero transmissivity. The placement of reflective or transmissive media is restricted to media region 830.

The y axis 834 is the locus of the images of the d=1, c=1 detector on the media support panel 122 (FIG. 1) as the support frame 170 (FIG. 2) moves in the y direction and the value of x measured by the x-axis interferometer 266 (FIG. 3) is held constant at some particular value. Similarly, the x axis 838 is the locus of the images of the same detector as the optical assembly 174 (FIG. 3) moves in the x direction and the value of y measured by the y-axis interferometer 270 (FIG. 3) is held constant at some particular value. The y axis will in general make a small angle $\Theta_i$ with the edge 842 of the detector array alignment region 826. The line 846 through the images of the c=1 detectors on the media support panel 122 (FIG. 1) will make a small angle $\Theta_a$ with the edge 842. The values of both $\Theta_i$ and $\Theta_a$ are initially unknown and must be measured during the calibration process.

The value of $y_{call}$ is chosen such that all of the detectors in detector array 330 (FIG. 6) are imaged within the transmissive media calibration region 818.

After writing $y_{cal}$ to the y-axis motor controller 630 (FIG. 11), y is read 850 and compared with $y_{cal}$ 854. When y equals $y_{cal}$, the operations 858 are performed. The transmissive media illuminator 190 (FIG. 3) is turned on, a 2 is entered into the p register, and $x_t$ is entered into the $x_p$ register. The quantity $x_p$ is the x coordinate that the optical assembly 174 (FIG. 3) is driven to for calibration. The value of $x_t$ is chosen such that all of the detectors in detector array 330 (FIG. 6) are imaged within the transmissive media calibration region 818.

The microprocessor writes $x_p$ to the x-axis motor controller 614 (FIG. 11) 862 and then reads x 866 and compares it with $x_p$ 870, repeating the sequence of operations until x equals $x_p$. When that event occurs, a 0 is entered into the w register and the TA interrupts are enabled 874.

The execution of the TA interrupt routine (FIG. 14) followed by the execution of the SA interrupt routine (FIG. 15) for each detector in detector array 330 (FIG. 6) results in the storage of detector voltages corresponding to detector exposures to a medium of uniform transmissivity. This data provides the means for calculating the responsivities of the individual detectors.

The microprocessor waits for w to equal one 878 and then determines whether p is equal to one 882. If it is not, the microprocessor performs the operations 886 consisting of turning off the transmissive media illuminator 190 (FIG. 3), turning on the reflective media illuminator 574 (FIG. 3), and entering 1 into the p register and $x_r$ into the $x_p$ register. The value of $x_r$ is chosen such that all of the detectors in detector array 330 (FIG. 6) are imaged within the reflective media calibration region 822. The routine beginning with the operation 862 is then repeated.

If the transmissivity of the transmissive media calibration region 818 or the reflectivity of the reflective media calibration region 822 varies over the respective regions to an unacceptable degree, the detector compensation routine shown in FIG. 13 should be performed a number of times for different values of $y_{call}$ and either $x_t$ or $x_r$ or both. The average detector outputs should be stored in the V(p,d,c) memory.

Figure 17:
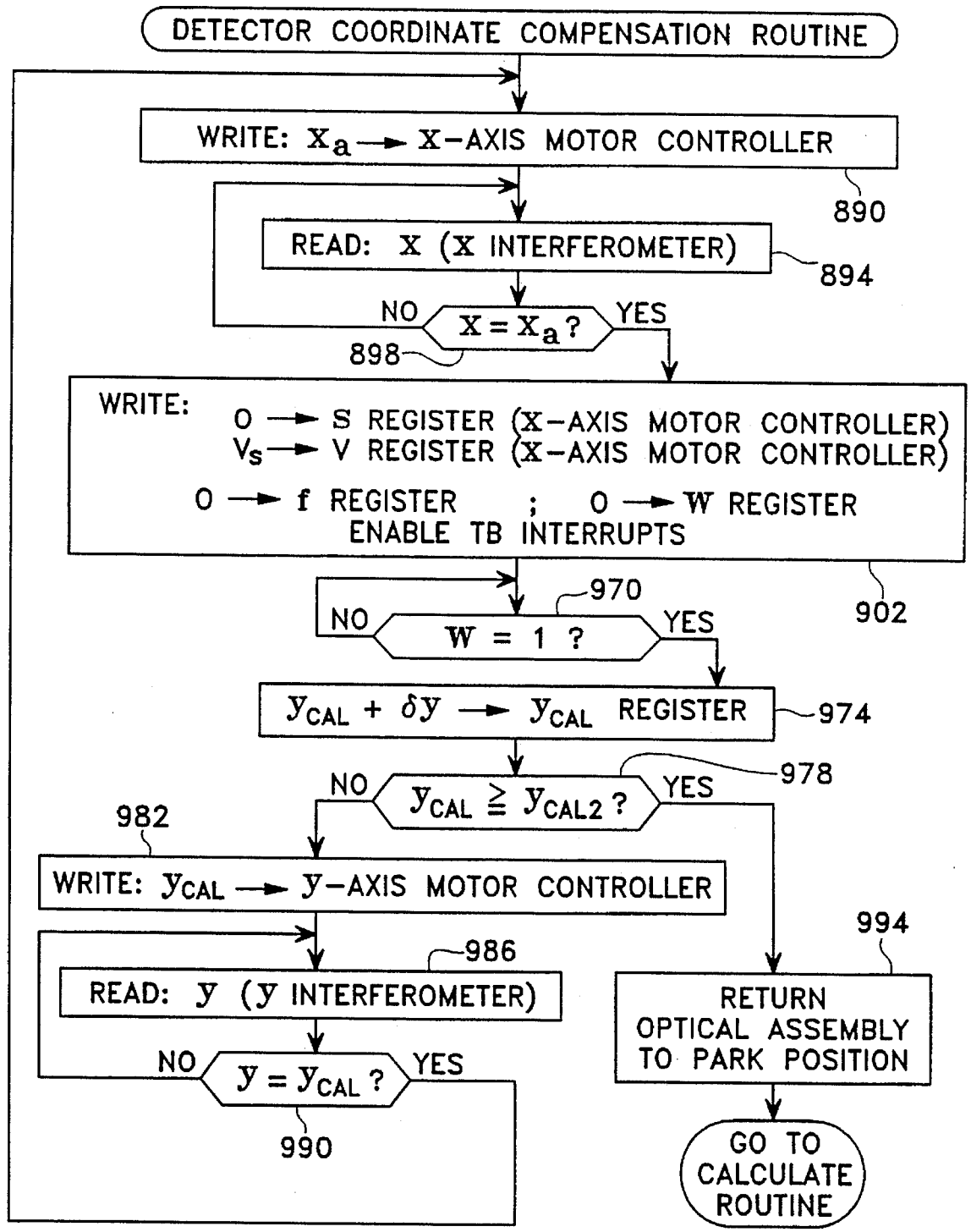
FIG. 17 is the flow diagram for the detector coordinate compensation routine.

If the comparison 882 reveals that p equals 1, the detector compensation routine has been exercised for all values of p and the microprocessor then goes to the detector coordinate compensation routine (DCCR) shown in FIG. 17.

The microprocessor writes $x_a$ to the x-axis motor controller 614 (FIG. 11) 890. The quantity $x_a$ is chosen such that the line $x=x_a$ is within the reflective media calibration region 822 and the detector array alignment region 826 for the entire range of y values. The microprocessor then reads x 894 and compares x with $x_a$ 898. The two operations are repeated until x equals $x_a$ at which time the operations 902 are performed. A 0 is written into the s (scan direction) register and $v_s$ into the v (scan velocity) register of the x-axis motor controller 630 (FIG. 11) which causes the optical assembly 174 (FIG. 3) to scan at a constant velocity $v_s$ in the direction of increasing x. Zeros are entered into the w and f registers and the TB interrupts are enabled. The f parameter is a control flag, the purpose of which will become apparent during the discussion of the TB and SB interrupt routines.

The TB interrupt signal is the same as the TA interrupt signal. It is the square-wave signal supplied by the timing generator 590 (FIG. 11), the low-to-high transition of which causes the transfer of the contents of the three linear detector arrays that comprise detector array 330 (FIG. 6) to the associated CCD shift registers.

Figure 18:
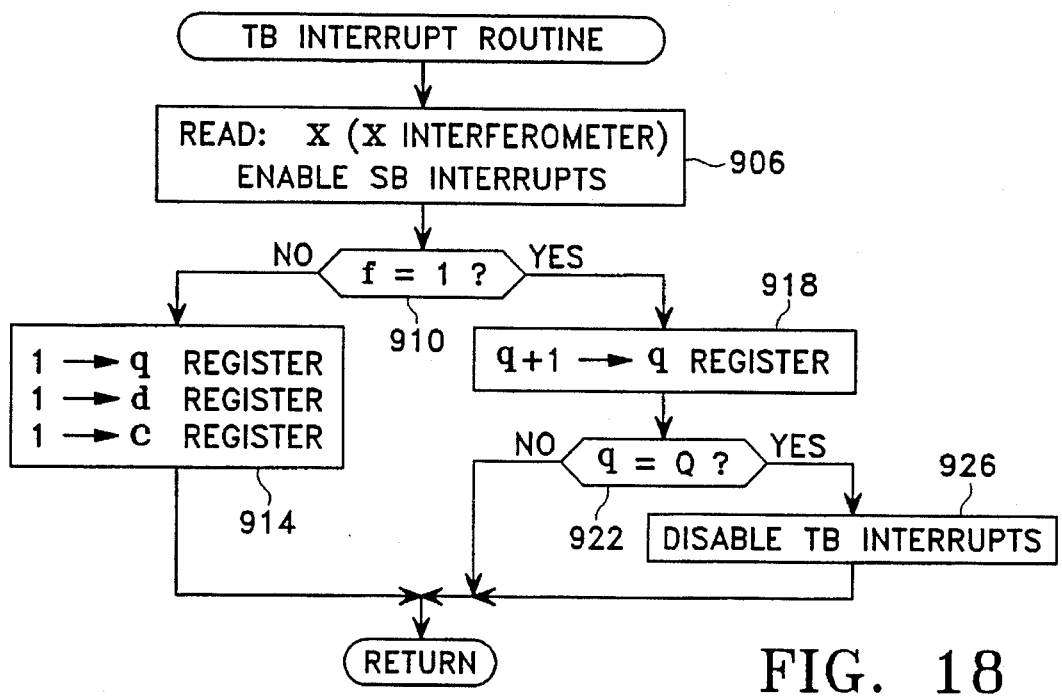
FIG. 18 is the flow diagram for the TB interrupt routine.

When the rising transition of the TB interrupt signal occurs, the microprocessor immediately performs the operations 906 of the TB interrupt routine shown in FIG. 18. The microprocessor reads x and enables the SB interrupts. It then determines whether the f flag has been set 910. If it has not been set (which will be true immediately after the TB interrupts were enabled), 1's are entered into the q, d, and c registers.

The q parameter measures the number of SB interrupts that occur after the first occurrence of a detector image crossing the boundary between the region consisting of the opaque reflective media calibration region 822 and the detector array alignment region 826 and the transparent media region 830 (see FIG. 16).

If it is determined that the f flag has been set 910, the q register is incremented 918 and q is compared with Q 922. A total of Q SB interrupts are permitted to occur before changing the y coordinate, the value of Q being chosen sufficiently large that the boundary transition will be detected by all detectors in the array. If q does not equal Q, the microprocessor returns to the DCCR (FIG. 17). If q does equal Q, the microprocessor disables the TB interrupts 926 and then returns to the DCCR.

The SB interrupt signal, just like the SA interrupt signal, is a square wave supplied by the timing generator 590 (FIG.

Figure 19:
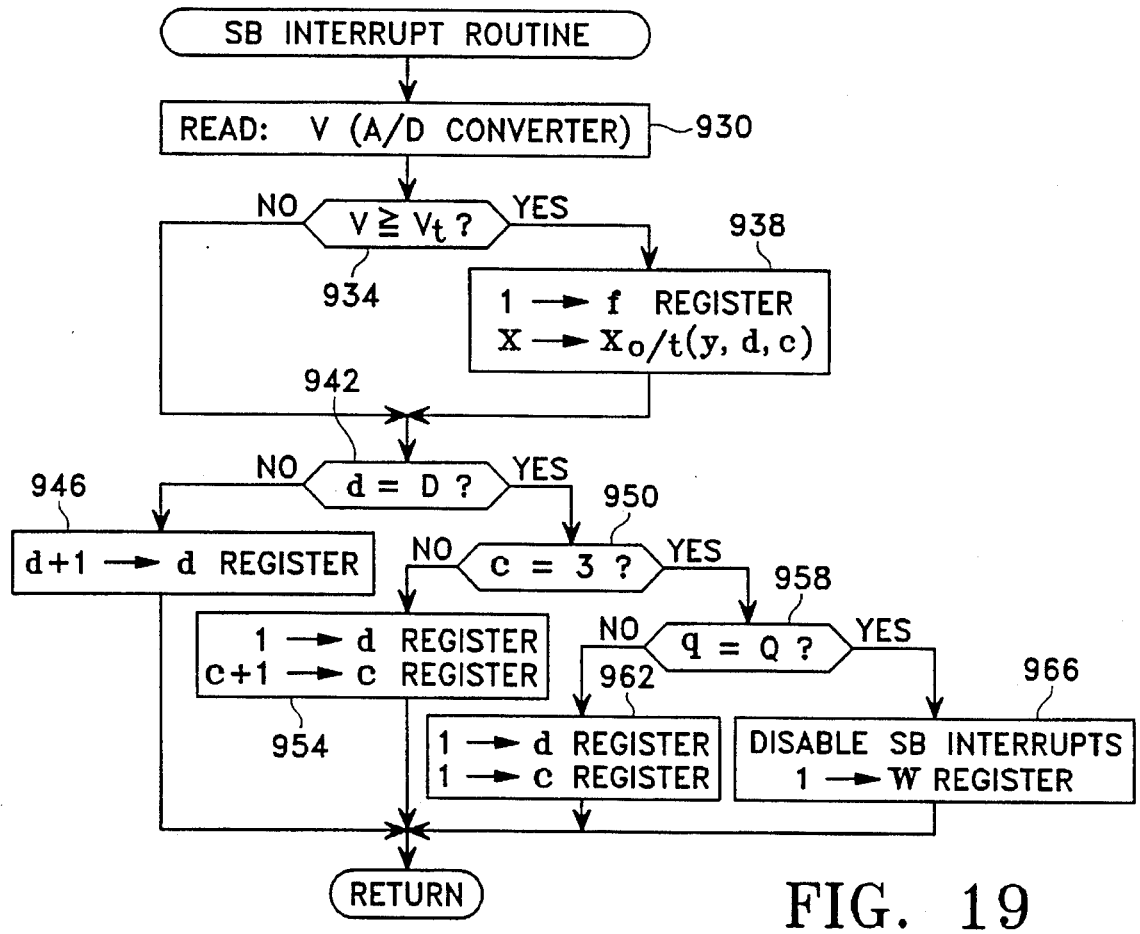
FIG. 19 is the flow diagram for the SB interrupt routine.

11), the rising transition of which coincides with the availability from the A/D converter 606 (FIG. 11) of a digitized value of the output of detector d that was exposed to the light color c. When the rising transition of the SB interrupt signal occurs, the microprocessor immediately goes to the SB interrupt routine shown in FIG. 19, after completion of the TB interrupt routine triggered by the prior TB interrupt signal, and reads V 930.

The microprocessor next compares V with a threshold voltage $V_t$ 934. The threshold voltage $V_t$ is a predetermined voltage that is roughly half way between voltages that result from exposure of the detectors to the opaque regions 822 and 826 and the voltages that result from exposure of the detectors to the transparent region 830.

If V is less than $V_t$, the microprocessor goes immediately to the test 942. Otherwise, it performs the operations 938 of setting the f flag and storing x in the memory location reserved for the opaque/transparent boundary coordinate $x_{o/t}(y,d,c)$ and then determines whether d is equal to D 942. If d is less than D, the output of another detector remains to be read. The d register is incremented 946 and the microprocessor then returns to the DCCR to wait for the next SB interrupt.

If d equals D, a test of c is made 950. If c is less than 3, the outputs of a linear detector array corresponding to another color remain to be read and operations 954 are performed. A 1 is entered into the d register and c+1 is entered into the c register. The microprocessor then returns to the DCCR.

If c equals 3, q is tested 958. If q is less than Q, there may be some detector images that have not crossed from the opaque regions 822 and 826 to the transparent region 830 of the exposed region of the media support panel 814 (see. FIG. 16) and the detector readout process must continue. Ones are entered into the d and c registers 962 and the microprocessor returns to the DCCR.

If q equals Q, the boundary between the opaque regions 822 and 826 and the transparent region 830 of the exposed region of the media support panel 814 (see. FIG. 16) has been established for the present y position of the detector array 330 (FIG. 6). The SB interrupts are disabled and a 1 is entered into the w register 966. The microprocessor then returns to the DCCR for the purpose of adjusting y.

Each time the microprocessor returns to the DCCR after performing the TB and SB interrupt routines, it waits (FIG. 17) for w to equal one 970. When this event occurs, the microprocessor enters $y_{cal}+\delta y$ into the $y_{cal}$ register 974 and determines 978 whether $y_{cal}$ is greater than or equal to $y_{cal2}$ where $y_{cal2}$ is the largest value of y for which the boundary between the opaque regions 822 and 826 and the transparent region 830 of the exposed region of the media support panel 814 (see. FIG. 16) can be determined. If $y_{cal}$ is less than $y_{cal2}$, the microprocessor writes $y_{cal}$ into the y-axis motor controller 630 (FIG. 11) 982. The microprocessor repeatedly reads y 986 and repeats the DCCR when it determines that y equals $y_{cal}$ 990.

Figure 20:
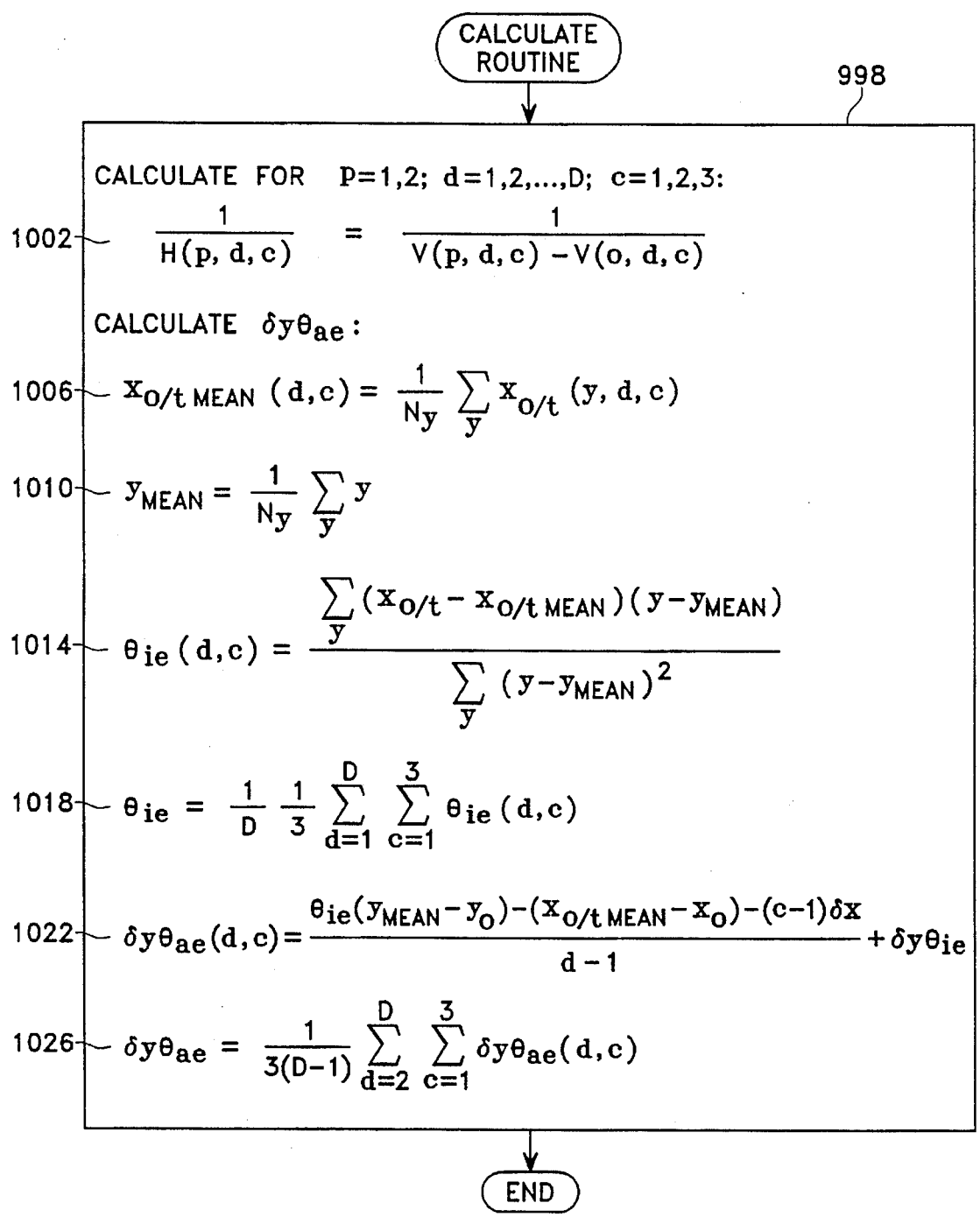
FIG. 20 is the flow diagram for the calculate routine.

If the microprocessor finds that $y_{cal}$ equals or exceeds $y_{cal2}$ 978, it returns the optical assembly to its "park" position 994 and goes to the calculate routine shown in FIG. 20 and performs the calculations 998.

The voltage V(p,d,c) produced by a detector d exposed to a light color c from a pixel illuminated by media illuminator p is given by the equation $$V(p,d,c)=H(p,d,c)G+V(p=0,d,c) \quad (1)$$

where $$H(p,d,c)=R(p,d,c)G_{r/t}(p)A(p)\Omega\phi(p),$$

G is the reflectivity (p=1) or transmissivity (p=2) of the pixel referenced to $G_{r/t}(p)$; V(p=0,d,c) is the detector voltage that results from the detector dark current when the detector is shielded from ambient light; R(p,d,c) is the responsivity of the detector to the light incident on the color filter that lies on top of the detector; $G_{r/t}$ is either (1) 0 (p=0), (2) the reflectivity (p=1) of the reflective media calibration region 822 (FIG. 16), or (3) the transmissivity (p=2) of the transmissive media calibration region 818; A(p) is the pixel area; Q is the solid angle that defines the pixel light that reaches the detector; and $\phi(p)$ is the irradiance (power per unit area) of light from the illuminator.

The quantity G for each pixel is the desired output from the high-resolution scanning apparatus. From equation (1), $$G=(V(p,d,c)-V(p=0,d,c))/H(p,d,c) \quad (2)$$

The detector voltage that results from the detector dark current is obtained by shielding the detector array 330 (FIG. 6) from ambient light which corresponds to $G_{r/t}$ being equal to 0 in equation (1).

The quantity H(p,d,c) in equation (2) is obtained by setting G equal to 1 in equation (1) which corresponds to the calibration mode discussed above.

$$H(p,d,c)=V(p,d,c)-V(p=0,d,c) \quad (3)$$

The reciprocal of the expression to the left of the equal sign in equation (3) is calculated 1002 by the microprocessor in performing the calculate routine shown in FIG. 20.

The image of detector d that is exposed to light of color c has an x coordinate x(d,c) that is given by the equation (see FIG. 16)

$$x(d,c)=x+(c-1)\delta x+(d-1)\delta y\Theta_a \quad (4)$$

where x is the x coordinate measured by the x-interferometer 266 (FIG. 3) and which can be taken to be the x coordinate of the d=1, c=1 detector, $\delta x$ is the spacing between the linear detector arrays that are exposed to different colors, and $\delta y$ is the spacing between detectors in the same linear detector array. The origin of the coordinate system shown in FIG. 16 has the coordinates $(x_o,y_o)$ in the coordinate system established by the x-axis and y-axis interferometers.

Let x'(d,c) be the value of x(d,c) when the detector image coincides with the edge 842 of the detector array alignment region 826 (FIG. 16). From the figure, $$x'(d,c)=x_o+\Theta_i[(y-y_o)+(d-1)\delta y] \quad (5)$$

If the expression for x'(d,c) is substituted for x(d,c) in equation (4), the value of x—denoted by $x_{t/o}$—is given by the equation $$(x_{o/t}-x_o)=\Theta_i(y-y_o)-(c-1)\delta x-(d-1)\delta y(\Theta_a-\Theta_i) \quad (6)$$

The quantity $x_{o/t}$ is the reading of the x-interferometer 266 (FIG. 3) when the detector corresponding to the indices d and c coincides with the edge 842 of the alignment region 826 (FIG. 16).

If follows from equation (6) that $$(x_{o/tMEAN}-x_o)=\Theta_i(y_{MEAN}-y_o)-(c-1)\delta x-(d-1)\delta y(\Theta_a-\Theta_i) \quad (7)$$

where the means are taken over all available values of y.

The linear mean square regression curve that best represents the data $x_{o/t}$ in terms of y is obtained by substituting the estimates $\Theta_{ie}$ and $\Theta_{ae}$ for $\Theta_i$ and $\Theta_a$ respectively in equation (6). The quantity $\Theta_{ie}$ is given by the equation $$\Theta_{ie} = (1/D) \Sigma \Theta_{ie}(d,c) \quad (8)$$

where the sum extends over all values of d and c and $$\Theta_{ie}(d,c) = \Sigma(x_{o/t} - x_{o/tMEAN})(y - y_{MEAN}) / \Sigma(y - y_{MEAN})^2 \quad (9)$$

where the sum extends over all values of y. The substitution of $\Theta_{ie}$ and $\Theta_{ae}$ for $\Theta_i$ and $\Theta_a$ respectively in equation (7) yields the equation $$\delta y \Theta_{ae} = (1/(D-1)) \Sigma \delta y \Theta_{ae}(d,c) \quad (10)$$

where the sum extends over all values of c and values of d from 2 to D and $$\delta y \Theta_{ae}(d,c) = [1/(d-1)][\Theta_{ie}(y_{MEAN} - y_o) - (x_{o/tMEAN} - x_o) - (c-1)\delta x] + \delta y \Theta_{ie} \quad (11)$$

The microprocessor calculates the mean of $x_{o/t}(d,c)$ 1006 (FIG. 20) by summing the Ny available values and then dividing by $N_y$ where $N_y$ is equal to 1 plus the integer portion of $(y_{cal1} - y_{cal2}) / \delta y_{cal}$. It calculates the mean of y 1010 by summing the $N_y$ available values of y and then dividing by $N_y$. It calculates $\Theta_{ie}(d,c)$ 1014 in accordance with equation (9). It calculates $\Theta_{ie}$ 1018 in accordance with equation (8). It calculates $\delta y \Theta_{ae}(d,c)$ 1022 in accordance with equation (11). The quantity $y_o$ is equal to $y_{cal1}$. The quantity $x_o$ is stored in memory as $x_{o/t}(y=y_{cal1}, d=1, c=1)$ (see operation 938, FIG. 19). The microprocessor calculates $\delta y \Theta_{ae}$ 1026 in accordance with equation (10). The calibration process ends with the completion of the calculation 1026.

The translation of pixel reflectivity or transmissivity into digital data begins when the high-resolution scanning apparatus is in the "operate" mode and the TC interrupts are enabled by the microprocessor as part of operations 762 (FIG. 12). The TC interrupt signal is the same as the TA and TB interrupt signals. It is the square-wave signal supplied by the timing generator 590 (FIG. 11), the low-to-high transition of which causes the transfer of the contents of the three linear detector arrays that comprise detector array 330 (FIG. 6) to the associated CCD shift registers.

Figure 21:
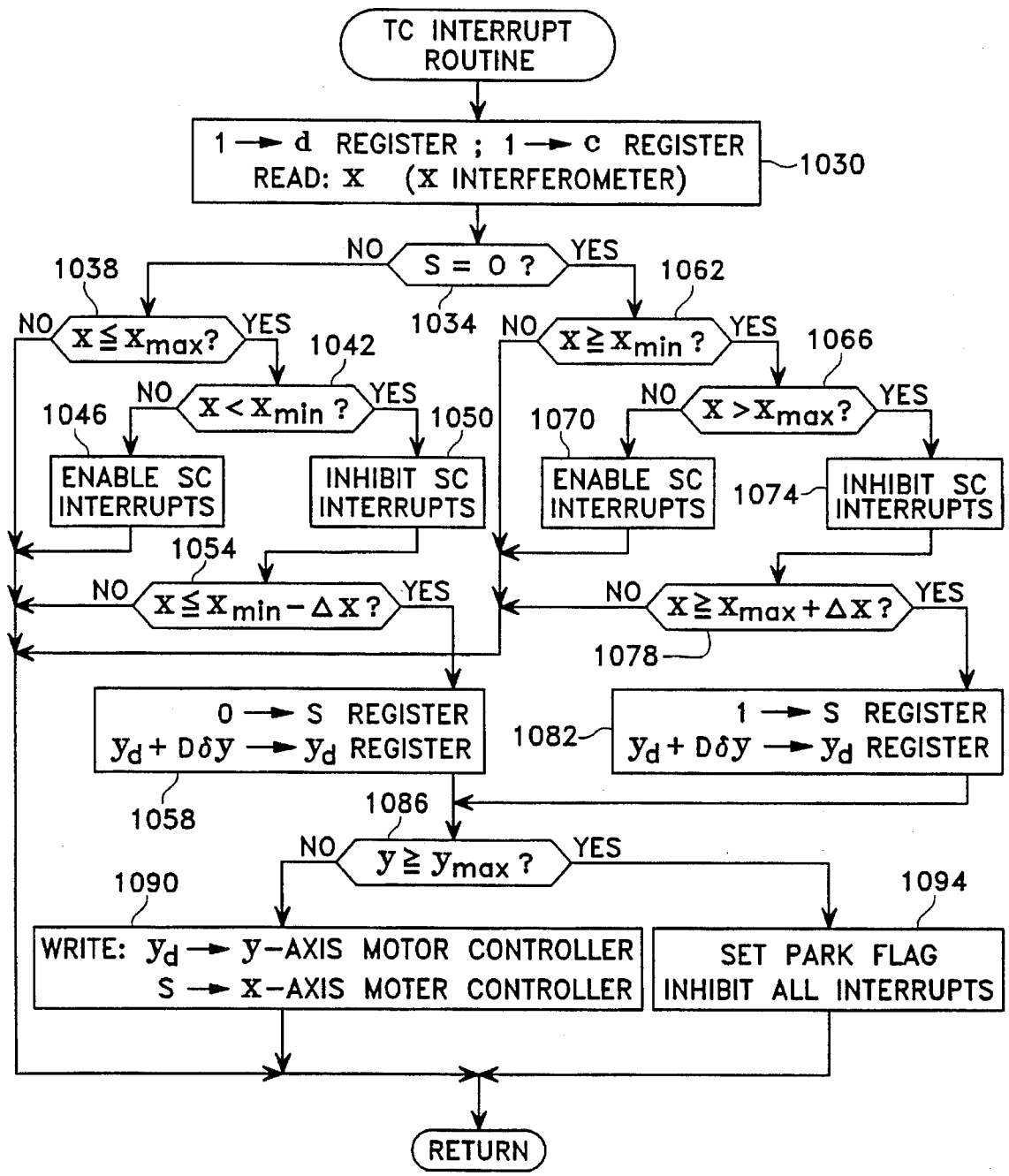
FIG. 21 is the flow diagram for the TC interrupt routine.

When the rising transition of the TC interrupt signal occurs, the microprocessor immediately performs the operations 1030 of the TC interrupt routine shown in FIG. 21. Ones are entered into the d and c registers and x is read.

The image of a detector on the image-containing medium constitutes a pixel. The pixel is intended to be no larger than a few micrometers in size and can be significantly less, depending on the magnification of the optical system. For a detector having an active area of say 12 μm×12 μm and an optical system with a magnification of 6, the pixel dimensions are 2 μm×2 μm.

Since the optical assembly 174 (FIG. 3) is scanning in the x direction at a constant velocity, the interrupt frequency and the scanning velocity are chosen such that the centroid of the detector active area scans from one edge of a pixel to the opposite edge in the time between interrupts. For a 2-μm pixel and a scanning velocity of 1 mm/s, the interrupt frequency should by 500 Hz.

The microprocessor next tests the direction of scan s 1034. If s equals 1 (scan in direction of decreasing x or from right to left in terms of FIGS. 1 and 16), the microprocessor determines whether x is less than or equal to $x_{max}$ 1038. If it is not, the microprocessor returns to the operate routine (FIG. 12). If it is, the microprocessor determines whether x is less than $x_{min}$ 1042. If it is not, the x-axis transport mechanisms 134, 138 are up to speed and causing the desired region (i.e. between $x_{min}$ and $x_{max}$) of the image-containing medium to be scanned. The microprocessor enables the SC interrupts 1046 and returns to the operate routine to wait for the interrupts to occur.

If x is less than $x_{min}$, the microprocessor disables the SC interrupts 1050 and determines whether x is less than $x_{min} - \Delta x$. If it is not, the microprocessor returns to the operate routine. If it is, it is time to prepare for the reverse scan 1058. The microprocessor enters 0 into the s register and $y_d + D \delta y$ into the $y_d$ register where D is the number of detectors in each of the three linear arrays that comprise detector array 330 (FIG. 6) and δy is the spacing between the detector images on the media support panel 122 (FIG. 2).

Each x-axis scan causes the images of the detectors that make up each of the three y-aligned linear detector arrays to sweep across the image-containing medium. By scanning back and forth in x at intervals of Dδy in y, the pixels in the desired region are read out completely with no overlap.

The use of the tilting platform 178 (FIGS. 2 and 3) can be avoided by scanning back and forth in x at intervals of Mδy where M is some integer less than D. Without the corrections in y provided by the tilting platform, the boundaries of the scanned strip may wander back and forth in the y dimension by as much as 5 to 10 rows. However, by choosing M equal to say D−20, the user is assured of obtaining complete pixel data for the region. Redundant data can be recognized and eliminated by the appearance of multiple transmissivity/reflectivity values corresponding to the same x and y coordinates.

If the scan direction is in the direction of increasing x (s=0) 1034, the microprocessor compares x with $x_{min}$ 1062. If x is less than $x_{min}$, the microprocessor returns to the operate routine. If x is equal to or greater than $x_{min}$, the microprocessor compares x with $x_{max}$ 1066. If x is equal to or less than $x_{max}$, the x-axis transport mechanisms 134, 138 are up to speed and causing the desired region (i.e. between $x_{min}$ and $x_{max}$) of the image-containing medium to be scanned and the microprocessor enables the SC interrupts 1070.

If x is greater than $x_{max}$, the microprocessor disables the SC interrupts 1074 and compares x with $x_{max} + \Delta x$ 1078. If x is less than $x_{max} + \Delta x$, the microprocessor returns to the operate routine. Otherwise, the microprocessor prepares for the reverse scan by entering 1 into the s register and $y_d + D \delta y$ into the $y_d$ register.

After performing operations 1058 and 1082, the microprocessor compares y with $y_{max}$ 1086. If y is less than $y_{max}$, the desired portion of the image-containing medium has not been completely scanned and the microprocessor writes $y_d$ and s into the y-axis motor controller 630 (FIG. 11) 1090. This last operation causes the y-axis transport mechanism 130 to move to $y=y_d$ and the x-axis transport mechanisms 134, 138 (FIG. 3) to begin a scan. Each time the x scan is halted and the direction of scanning is reversed, the x-axis transport mechanisms 134, 138 must travel a distance Δx before reaching the region of the image-containing medium to be scanned. The quantity Δx is of such a magnitude that the y-axis transport mechanism 130 reaches $y_d$ and the x-axis transport mechanisms reach constant velocity before pixel readout begins.

If y is equal to or greater than $y_{max}$ 1086, the scanning process has been completed and the microprocessor sets the "park" flag and disables all interrupts 1094. It then returns to and completes the operate routine.

Figure 22:
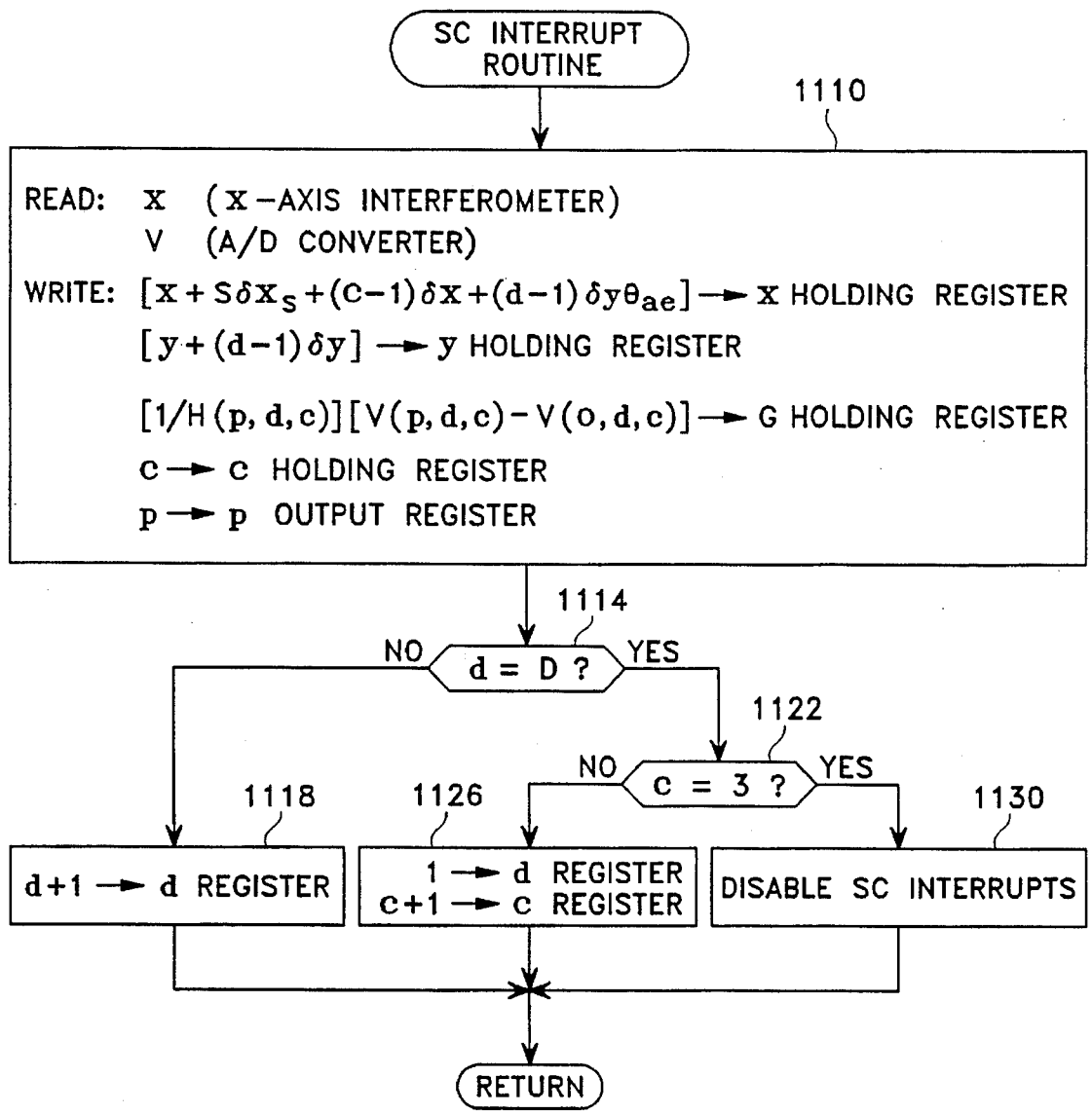
FIG. 22 is the flow diagram for the SC interrupt routine.

If x is greater than or equal to $x_{min}$ and less than or equal to $x_{max}$, the SC interrupts are enabled as a result of the operations 1046 and 1070. The SC interrupt signal, just like the SA and SB interrupt signals, is a square wave supplied by the timing generator 590 (FIG. 11), the rising transition of which coincides with the availability from the A/D converter 606 (FIG. 11) of a digitized value of the output of detector d that was exposed to the light color c. When the rising transition of the SC interrupt signal occurs, the microprocessor immediately goes to the SC interrupt routine shown in FIG. 22 and performs the operations 1110.

The microprocessor first reads x and V and then writes into the x holding register 650 (FIG. 11) the expression given by equation (4) with the $\Theta y \delta_{ae}$ calculated during the calculate routine (FIG. 20) substituted for $\delta y \Theta_a$ and the extra term $s\delta x_s$ added. The quantity $\delta x_s$ is the distance traveled by the optical assembly 174 (FIGS. 2 and 3) between TC interrupts. This expression without the $s\delta x_s$ term corresponds to the x coordinate at the time of the last TC interrupt of the image of detector d that is exposed to light of color c. It also corresponds to the right-hand edge of the pixel from which most of the light emanates when the scan is from left to right and to the left-hand edge when the scan is from right to left. The $s\delta x_s$ term must be included if this expression is to uniquely represent the x coordinate of a particular pixel when scanned in either direction.

The measured y coordinate corresponds to the location of the image of the d=1 detector on the image-containing medium. The image of the d'th detector has a y coordinate of $y+(d-1)\delta y$ where $\delta y$ is the spacing between the detector images. This expression also corresponds to the y coordinate of the pixel measured by the d'th detector and is entered by the microprocessor into the y holding register.

The expression to the right of the equal sign in equation (2) with V (read from the A/D converter 606 (FIG. 11)) substituted for V(p,d,c) is computed by the microprocessor and entered into the G holding register 658 (FIG. 11). The numerator of the second term of the expression V(p=0,d,c) is available in memory as a result of having performed the TA and SA interrupt routines (see FIGS. 14 and 15) and the denominator is also available in memory as a result of having performed calculation 1002 of the calculate routine (see FIG. 20).

The microprocessor enters the light color c to which the pixel reflectivity/transmissivity G(p) corresponds into the c holding register 662 (FIG. 11). The microprocessor enters the type of image-containing medium being scanned, i.e. reflective or transmissive, into the p output register 680 at the beginning of the readout process.

After the data has been entered into the holding registers, the microprocessor compares d with D 1114. If d does not equal D, the microprocessor increments the d register 1118 and returns to the operate routine to wait for the next SC interrupt. If d is equal to D, the microprocessor compares c with 3 1122. If c does not equal 3, the microprocessor performs the operations 1126 of entering 1 into the d register and incrementing the c register. It then returns to the operate program and waits for the next SC interrupt.

If d is equal to D and c is equal to 3, all of the detector array data has been read out. The microprocessor than disables the SC interrupts and returns to the operate routine and waits for the next TC interrupt.

The microprocessor alternately performs the TC interrupt routine followed by 3D SC interrupt routines until the region of the image-containing medium for which data is desired has been completely scanned at which time the microprocessor ends the scanning process by parking the optical assembly 174 (FIGS. 2 and 3).

What is claimed is:

1. A distance-measuring apparatus for measuring the distance to a light-reflecting surface, said apparatus comprising:

a means for generating a coherent planar light wave, a means for splitting said light wave into a first light wave and a second light wave;

a means for directing said first light wave to said reflecting surface, said first light wave being reflected from said reflecting surface and returning to said distance-measuring apparatus;

a reference mirror;

a means for directing said second light wave to said reference mirror, said second light wave being reflected from said reference mirror;

a means for combining said reflected first light wave and said reflected second light wave into a combination plane wave, the amplitude of said combination plane wave being a function of the difference in phases of said reflected first and second waves at the point of said combining, the phases of said reflected first and second light waves being linearly related to first and second propagation times, said first propagation time being the time for said first light wave to travel from said splitting means to said reflecting surface and then to said combining means, said second propagation time being the time for said second light wave to travel from said splitting means to said reference mirror and then to said combining means;

a means for varying said second propagation time about an average value thereby causing the phase of said second reflected wave at the point of combination with said first reflected wave to shift back and forth between a first phase and a second phase;

a means for obtaining an electrical measure of the power of said combination plane wave;

a means for determining the changes in the difference in the phase of said first reflected light wave and the average phase of said second reflected light wave and for computing the algebraic sum of said changes from said power measure and said variations in said second propagation time comprising an electronic circuit for converting said power measure into a first square wave and a second square wave, the transitions between low and high values for said first square wave coinciding with average value crossings of said power measure if the phase of said second reflected light wave were constant and equal to said first phase, the transitions between low and high values for said second square wave coinciding with average value crossings of said power measure if the phase of said second reflected light wave were constant and equal to said second phase.

2. The distance-measuring apparatus of claim 1 wherein said means for determining the changes in the difference in phase of said first and second reflected light waves and for computing the algebraic sum of said changes further comprises an electronic circuit for counting low-to-high and high-to-low transitions of said first square wave, said counting circuit not counting either of two successive transitions when the second of said transitions follows the first within a specified time interval, said counting circuit counting upward when said low-to-high transition coincides with said second square wave being low and when said high-to-low transition coincides with said second square wave being high, said counting circuit counting downward when said low-to-high transition coincides with said second square wave being high and when said high-to-low transition coincides with said second square wave being low, the positive (negative) count maintained by said counting circuit corresponding to the cumulative increase (decrease) in the length of the path traveled by said first light wave from said splitting means to said reflecting surface and back to said combining means measured in units of half wavelengths.

3. The distance-measuring apparatus of claim 2 wherein said means for varying said second propagation time comprises:

a piezoelectric device having first and second parallel planar surfaces, said reference mirror being mounted on said first surface, said second surface being fixedly positioned with respect to said combining means;

a means for applying an alternating voltage to said piezoelectric device thereby causing the distance between said first and second surfaces of said piezoelectric device to change, a source of the alternating voltage.

4. A method for measuring the distance to a light-reflecting surface, said method comprising the steps:

generating a coherent planar light wave, splitting said light wave into a first light wave and a second light wave;

directing said first light wave to said reflecting surface, said first light wave being reflected from said reflecting surface and returning;

placing a reference mirror where said second light wave can be reflected from said reference mirror;

directing said second light wave to said reference mirror, said second light wave being reflected from said reference mirror and returning;

combining said reflected first light wave and said reflected second light wave into a combination plane wave, the amplitude of said combination plane wave being a function of the difference in phases of said reflected first and second waves at the point of said combining, the phases of said reflected first and second light waves being linearly related to first and second propagation times, said first propagation time being the time for said first light wave to travel from the point of said splitting to said reflecting surface and back to the point of said combining, said second propagation time being the time for said second light wave to travel from the point of said splitting to said reference mirror and back to the point of said combining;

varying said second propagation time about an average value thereby causing the phase of said second reflected wave at the point of combination with said first reflected wave to shift back and forth between a first phase and a second phase;

obtaining an electrical measure of the power of said combination plane wave;

determining the changes in the difference in phase of said first reflected wave and the average phase of said second reflected light wave and computing the algebraic sum of said changes from said power measure and said variations in said second propagation time comprising the step of converting said power measure into a first square wave and a second square wave, the transitions between low and high values for said first square wave coinciding with average value crossings of said power measure if the phase of said second reflected light wave were constant and equal to said first phase, the transitions between low and high values for said second square wave coinciding with average value crossings of said power measure if the phase of said second reflected light wave were constant and equal to said second phase.

5. The method of claim 4 wherein said change determining step further comprises the step of counting low-to-high and high-to-low transitions of said first square wave except for either of two successive transitions when the second of said transitions follows the first within a specified time interval, counting being upward when said low-to-high transition coincides with said second square wave being low and when said high-to-low transition coincides with said second square wave being high, counting being downward when said low-to-high transition coincides with said second square wave being high and when said high-to-low transition coincides with said second square wave being low, a positive (negative) count corresponding to the cumulative increase (decrease) in the length of the path traveled by said first light wave from the point of said splitting to said reflecting surface and back to the point of said combining measured in units of half wavelengths.

6. Means for practicing the method of claim 4.

* * * * *